US012520772B2

(12) United States Patent
Karydis et al.

(10) Patent No.: US 12,520,772 B2
(45) Date of Patent: Jan. 13, 2026

(54) LEAF DETECTION AND EXTRACTION SYSTEM

(71) Applicant: The Regents of the University of California, Oakland, CA (US)

(72) Inventors: Konstantinos Karydis, Laguna Beach, CA (US); Merrick Campbell, Riverside, CA (US); Amel Dechemi, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 323 days.

(21) Appl. No.: 18/453,908

(22) Filed: Aug. 22, 2023

(65) Prior Publication Data

US 2024/0057527 A1    Feb. 22, 2024

Related U.S. Application Data

(60) Provisional application No. 63/399,988, filed on Aug. 22, 2022.

(51) Int. Cl.
| | |
|---|---|
| *A01G 3/00* | (2006.01) |
| *B25J 5/00* | (2006.01) |
| *G01N 1/08* | (2006.01) |
| *G06T 7/00* | (2017.01) |
| *G06T 7/70* | (2017.01) |

(52) U.S. Cl.
CPC ............... *A01G 3/00* (2013.01); *G01N 1/08* (2013.01); *G06T 7/0012* (2013.01); *G06T 7/70* (2017.01); *G06T 2207/10028* (2013.01); *G06T 2207/30188* (2013.01); *G06T 2207/30252* (2013.01)

(58) Field of Classification Search
CPC .......... A01G 3/00; A01G 7/00; A01G 17/005; G01N 1/08; G01N 1/04; G06T 7/0012; G06T 7/70; G06T 2207/10028; G06T 2207/30188; G06T 2207/30252; G06T 2207/20084; G06T 7/73; B25J 5/007; B25J 11/0055; B25J 15/0066; B25J 15/0616; B25J 19/023
See application file for complete search history.

(56) References Cited

U.S. PATENT DOCUMENTS

| | | | | |
|---|---|---|---|---|
| 7,854,108 | B2 * | 12/2010 | Koselka | A01D 91/00 |
| | | | | 701/50 |
| 2022/0087106 | A1 * | 3/2022 | Faulring | B25J 15/0616 |
| 2025/0134021 | A1 * | 5/2025 | Gordon-Kamm | A01G 22/00 |

* cited by examiner

*Primary Examiner* — Siamak Harandi
(74) *Attorney, Agent, or Firm* — Morrison & Foerster LLP

(57) ABSTRACT

Disclosed herein is a system and methods for leaf detection and extraction. The extracted leaf may be used for leaf water potential analysis. In some embodiments, the method comprises identifying the leaf from a point cloud based on an image, determining a pose of the leaf based on the point cloud, and cutting and storing the leaf based on the pose of the leaf.

22 Claims, 31 Drawing Sheets

LEAF DETECTION AND EXTRACTION SYSTEM

CROSS-REFERENCE TO RELATED APPLICATION

This application claims the benefits of U.S. provisional application No. 63/399,988, filed Aug. 22, 2022, the contents of which are incorporated herein by reference in its entirety for all purposes.

ACKNOWLEDGEMENT OF GOVERNMENT SUPPORT

This invention was made in part with government support under Grant #2021-67022-33453 awarded by USDA-NIFA. The government has certain rights in the invention.

BACKGROUND

Current robots in precision agriculture mostly focus on automated harvesting or remote sensing to monitor crop health. Comparatively less work has been performed with respect to collecting physical leaf samples in the field and retaining them for further analysis. Orchard growers manually collect sample leaves and utilize leaf water potential measurements to analyze tree health and determine irrigation routines. While this technique benefits orchard management, the process of collecting, assessing, and interpreting measurements requires significant human labor. Automating parts of this process via the use of mobile robots can help decrease labor burden and increase the accuracy and frequency of data collections.

Precision agriculture is an increasingly adopted farming practice that utilizes networks of ground and remote sensors to help improve use of agronomic inputs (e.g., water, fertilizers, pesticides). Robotics research within the precision agriculture domain has largely focused on remote sensing via either ground or aerial robots. Besides remote sensing, an increasing number of works has begun addressing interactions with the crop. Such works consider primarily robotic harvesting, including in row crops (such as corn and soybean) and in tree crops (such as citrus and avocado). For example, autonomous robots are deployed to pick sweet peppers, apples, citrus, and tomatoes by wrapping the fruit and twisting it off the stem with either a soft gripper, rigid gripper, or vacuum. Some robots can pick strawberries, cucumbers, citrus, and sweet peppers by cutting the stem.

The present disclosure relates to the interaction with tree crops and addresses a conceptually related yet less explored topic compared to robotic harvesting: robotic leaf sampling. Leaf sampling is important in agriculture since remote sensing and monitoring typically provides field-level information without sufficient resolution to accurately diagnose problems. Agronomists utilize specialized instruments that can be difficult to transport to the field environment, and thus rely upon sample retrieval for laboratory analysis. While this has been mostly a manual process to date, some work has been performed using aerial and ground robots. Mueller-Sim et al. demonstrated a robotic platform for rapid phenotyping that brought the laboratory to the field with the capability of manipulating leaves for in-situ measurement. Orol et al. developed a tele-operated aerial robot for cutting and collecting leaves from trees. Ahlin et al. presented an algorithm for selecting and grasping tree leaves using a robotic arm. The latter work demonstrates a high level of control using monoscopic depth analysis (MDA) and image based visual servoing, but focuses on grasping and pulling the leaf, instead of cleanly cutting the stem of the leaf.

It may be desirable to perform leaf water potential measurements, a critical process performed by agronomists to estimate tree stress levels, and hence optimize irrigation patterns. In this process, a leaf cleanly cut at its stem is placed inside a pressurized chamber instrument (colloquially called the "pressure bomb") with its cut end exposed, and then the pressure at which water begins to escape from the cut stem is used to determine the leaf water potential. Though effective, these instruments can be tedious and potentially dangerous to operate. Due to these constraints, a single tree is often used to quantify the health of the orchard leading to infrequent measurements and undersampled regions. Enabling robotic leaf sampling (this disclosure's focus) in either indoor or outdoor environments for future use in robotic leaf water potential analysis can help improve measurement coverage and frequency, while reducing human fatigue, risk of bodily injury, and labor costs.

Compared to existing robotic leaf sampling methods and harvesting systems that cut the stem of a fruit/vegetable, performing clean cuts at the leaves' stems and retaining leaves is further analyzed. As with related works, a visual perception component (to identify and localize a leaf) and an actuation component (to move the end-effector toward the leaf, and then cut it) is incorporated. Collecting a leaf sample from a tree in either indoor or outdoor environments presents unique challenges in perception and actuation, different from robotic harvesting systems. Importantly, finding a robust motion plan to retrieve a physical sample needs to account for the presence of other leaves and branches that make leaf detection harder than fruit detection, and can also interfere with the extraction process. Different from robotic leaf sampling systems, cleanly removing the leaf without damage to it or its stem also requires precise manipulation control, and calls for new end-effector designs to make such cuts possible.

Visual Perception in Agriculture

Visual perception can be used to monitor crop growth, help prevent disease through early detection, assist with quality control, and help automate harvesting. Success of these tasks depends on the visual perception system's ability to provide precise and accurate information about the target crop and relevant environmental context. Classical computer vision approaches often rely on the color, texture, or shape of the target and can be confounded by environmental factors such as light, occlusion, or overlapping surfaces that lead to segmentation and localization challenges. To overcome these issues, Convolutional Neural Networks (CNN) can be used to identify and detect the target fruit/vegetable by extracting higher-order features and regions of interest. Despite neural networks' high precision and generalization ability, the required computational resources can pose a challenge for real-time applications, besides the need to collect large data sets for training. On the other hand, identifying a leaf and its stem on a tree is a more challenging problem with classical methods since the process is more likely to be affected by occluded and overlapped leaves, as compared to segmenting fruits out of a canopy.

Robotic End-Effectors in Agriculture

Development of end-effectors for agricultural harvest applications continues to be an active area of research due to the wide variety of crops. Apples and citrus require a specific motion to grasp, twist, and pull from the tree without damage. Bell peppers and cucumbers can be directly cut and captured during harvesting. Crops like strawberries require more of a delicate touch, which motivates research into manipulators with force feedback and flexible pneumatic actuators. On the opposite end of the fragility spectrum, end-effectors have also been designed for larger and heavier crops such as pumpkins. Harvesting end-effectors generally have three primary components: the gripping mechanism (mechanical, pneumatic, or a hybrid), the removal mechanism (mechanical or electrical), and the perception sensors (monocular camera, stereo camera, time-of-flight). The end-effector contains similar primary components, with a focus on performing clean cut of a leaf's stem and retaining the leaf afterwards, a task that has received much less attention by existing robotic harvesting/leaf sampling technology, yet is an important aspect toward enabling future robotic leaf water potential measurements.

Contemporary robots in precision agriculture focus primarily on automated harvesting or remote sensing to monitor crop health. Comparatively less work has been performed with respect to collecting physical leaf samples in the field and retaining them for further analysis. Typically, orchard growers manually collect sample leaves and utilize them for stem water potential measurements to analyze tree health and determine irrigation routines. While this technique benefits orchard management, the process of collecting, assessing, and interpreting measurements requires significant human labor and often leads to infrequent sampling. Automated sampling can provide highly accurate and timely information to growers. The first step in such automated in-situ leaf analysis is identifying and cutting a leaf from a tree. This retrieval process requires new methods for actuation and perception.

Precision agriculture is a farming practice that utilizes sensor networks to help improve the use of agronomic inputs (e.g., water, fertilizers, pesticides). Robotics research in precision agriculture has largely focused on remote sensing via ground or aerial robots. Besides remote sensing, an increasing number of works have begun addressing interactions with the crop. Such works consider primarily robotic harvesting in both row (e.g., corn and soybean) and tree crops (e.g., citrus and avocado). For example, robots have been deployed to pick peppers, apples, citrus, and tomatoes by wrapping the fruit and twisting it off the stem with either a soft gripper, rigid gripper, or vacuum. Some robots can pick strawberries, cucumbers, citrus, and peppers by cutting the stem. The disclosure relates to the interaction with tree crops and addresses a conceptually related yet less explored topic compared to robotic harvesting: robotic leaf sampling. Leaf sampling is important in agriculture since remote sensing typically provides field-level information without sufficient resolution to accurately diagnose problems. Agronomists utilize specialized instruments that can be difficult to transport to the field and thus rely upon sample retrieval for later lab analysis. While this has been mostly a manual process to date, some work has been performed using aerial and ground robots. Mueller-Sim et al. demonstrated a robotic platform for rapid phenotyping and capable of manipulating leaves for in-situ measurements. Orol et al. developed a tele-operated aerial robot for cutting and collecting leaves from trees. Ahlin et al. presented an algorithm for selecting and grasping tree leaves using a robotic arm. The latter work demonstrates a high level of control using monoscopic depth analysis (MDA) and image-based visual servoing, but focuses on grasping and pulling the leaf instead of cleanly cutting the stem of the leaf. It may be desirable to perform leaf water potential measurements, an important process performed by agronomists to estimate tree stress levels and hence optimize irrigation patterns. A leaf cut at its stem is placed inside a pressurized chamber instrument with its cut end exposed, and then the pressure at which water begins to escape from the cut stem is used to determine the leaf water potential. Agronomists use this measurement as a proxy for tree stress levels to optimize irrigation patterns. Though effective, these instruments can be tedious and potentially dangerous to operate. As a result, a single tree is often used to quantify the health of the entire orchard leading to infrequent measurements and under-sampled regions. Enabling robotic leaf sampling for future use in robotic leaf water potential analysis can help improve measurement coverage and frequency while reducing human fatigue, and risk of bodily injury. Examples disclosed herein join a growing body of works on robotic means for monitoring crop health and improving irrigation management practices.

Compared to existing robotic leaf sampling methods and harvesting systems that cut the stem of a fruit/vegetable, performing clean cuts at leaves' stems and retaining leaves for stem water potential analysis may be more desirable. As with related works, a visual perception component (to identify and localize a leaf) and an actuation component (to move the end-effector toward the leaf, and then cut it) are incorporated. Collecting a leaf sample from a tree presents unique challenges in perception and actuation, different from robotic harvesting. Importantly, finding a motion plan to retrieve a physical sample needs to account for the presence of other leaves and branches that make leaf detection harder than fruit detection, and can also interfere with the extraction process.

Development of harvesting end-effectors is an active area of research due to the wide variety of crops. While there are some commonalities across approaches, differences in size, weight, shape, texture, and firmness of specialty crops have led to unique solutions. Apples and citrus require a specific motion to grasp, twist, and pull from the tree without damage. Bell peppers and cucumbers can be directly cut and harvested. More delicate crops like strawberries call for manipulators with force feedback and flexible pneumatic actuators. Despite their unique applications, harvesting end-effectors generally have three primary components: the gripping mechanism (mechanical, pneumatic or hybrid), the removal mechanism (mechanical or electrical), and the sensing modality (monocular camera, stereo camera, time-of-flight).

At the same time, there has been development of perception techniques to monitor crop growth, help prevent disease through early detection, assist with quality control, and help automate harvesting. Success of these tasks depends on the visual perception subsystem's ability to provide precise and accurate information about the target crop and relevant environmental context, including segmentation and localization of targets of interest. Most approaches have focused on fruit/vegetable targets by harnessing distinct colors and/or shapes.

The identification and pose estimation of individual tree-crop leaves are disclosed. This presents similar yet unique challenges compared to fruit (and broader canopy) identification. Instead of filtering out the leaves to focus on the fruit, it may be desirable to retain the leaves and segment the tree canopy further to obtain individual leaf poses. Leaf segmentation has been considered in current research using both classical computer vision tools as well as machine learning. However, classical methods are prone to changes in the environment, such as light, occlusions, or overlapping surfaces, whereas learning-based methods require large training datasets and may still generalize poorly as environmental factors vary.

Furthermore, these techniques have rarely been employed online on onboard computers as part of a robotic manipulation system to identify, localize, and physically cut the leaf Although a leaf's 3D position can be readily obtained, it is not sufficient to successfully accomplish the task as orientation plays an important role as to how a robotic arm approaches the leaf to cut it. Thus, obtaining at least an estimate of the 6D pose (position and orientation) is critical. Traditional 6D pose estimation approaches usually perform local keypoint detection and feature matching, and then uses a RANSAC-based PnP algorithm on the established 3D-to-2D correspondences to estimate the pose of an object. Still, they typically fail to perform with heavily occluded and poorly textured objects. On the other hand, learning-based methods use a deep neural network (DNN) to obtain the correspondences between 3D objects points and their 2D image projections. Use of synthetic data generators can relieve in part the challenge of acquiring large labeled datasets; however, it requires realistic models that take into account the variations of the detected object, e.g., shape, size, orientation, or curvature, which can be hard to develop.

As the field of agricultural robotics grows and matures, generally applicable technologies begin shifting toward optimized solutions for specialty crops and applications. In some embodiments, the application is leaf stem water potential analysis. Growers use cleanly cut leaf stems from trees in this industry-standard analysis to determine the irrigation schedules for their orchards. It may be desirable to automate the process, and in some embodiments, specifically considers the development and testing, either indoors or outdoors, of a custom end-effector to cut and retain leaves for subsequent stem water potential analysis. While several end-effectors exist for harvesting and pruning, no designs currently exist for cutting and capturing leaves for stem water potential analysis.

Adopting precision agriculture technologies can give growers useful insights regarding administration of agronomic inputs (e.g., irrigation, fertilizers, pesticides) through networks of ground and remote sensors. These monitoring techniques can accurately characterize soil-plant-environment processes to tune the timing and location for administering these inputs. At the focus of this work lies precision irrigation, which can increase grower net revenue and decrease the agriculture's environmental footprint by applying water directly where and when required. While discrete, in-situ soil sensors can be used to obtain accurate estimates of water available to plant roots throughout the soil profile, the industry standard for orchard irrigation practices remains leaf stem water potential analysis.

Leaf stem water potential (SWP) analysis, to date, remains a largely manual process. Typically, an agronomist or other field specialist will walk to the orchard, place small bags around leaves to sample, wait for them to settle (about 10 min), and cleanly cut the leaf at its stem for analysis. Then, the leaf is placed inside a pressurized chamber instrument (colloquially called the "pressure bomb") with its cut end exposed. The chamber is then pressurized and the pressure at which water begins to escape from the cut stem is used to determine the leaf water potential. Determination of xylem water flow (and reporting the respective pressure inside the chamber) happens manually by the user, requiring them to look at the xylem through a magnifying glass while operating the chamber. Agronomists use this measurement as a proxy for tree stress levels to optimize irrigation patterns. Since the pressure bomb instruments can be tedious to operate, a single tree (or only a handful at most) is often used to quantify the health of the entire orchard leading to infrequent measurements and undersampled regions. The pressure chambers can also be potentially dangerous to operate. Hence, SWP analysis lends itself as an appropriate target for automation science and engineering. The system design journey begins with defining the main input of the overall system: an end-effector that cleanly cuts the stem of a leaf and retains it for subsequent SWP analysis. Existing end-effectors in the agricultural domain have focused primarily on harvesting applications. Though there is a wide variety of crops (from broad-acre row crops to specialty crops like strawberries), many harvesting end-effectors share three common components: a retention mechanism to grip or capture the crop, a removal mechanism to detach the crop, and a sensing modality to detect the crop. Typical retention mechanisms employ mechanical, pneumatic, or hybrid means. The removal mechanism is often mechanical in the form of cutting, twisting, or pulling, but some designs have zapped stems with electrical energy for removal. The sensing modality is usually either a monocular, stereo, or time-of-flight camera. The end-effector developed herein utilizes a pneumatic system to improve leaf alignment, an enclosed chamber to capture the leaf, a razor blade to cut the leaf (FIG. 19), as well as a depth camera for future work to detect and localize the leaf.

For a leaf cutter end-effector to be viable for automation, the differences between a manually cut versus an end-effector-cut leaf must be minimal, as the subsequent process of taking SWP measurements requires uniform good quality cut leaves for accuracy and repeatability. The xylem comparisons presented later showcase the initial and final (wet) states of two xylems, one cut manually and the other by the end-effector. The states of both xylems appear practically identical since both leaves had their stems cut cleanly by either method. More importantly, the water expression is picked up by the camera and shown clearly in both final state images, enabling SWP measurements to be made through digital, and potentially automated means.

Agricultural Applications of End-Effectors

Various agricultural applications can benefit from the use of specialized end-effector designs able to perform robustly when considering the large variability in nature's elements. A gripper able to harvest fruits and vegetables, of which the design also proposes a cutting blade element was introduced, where Mask-RCNN was used to determine the bounding box and cutting points at the crop peduncle. Many other end-effector designs use a blade cutting mechanism to separate the crop or element of interest from its source. Examples in horticulture include strawberry picking, cherry tomatoes, sweet peppers, and also other relevant agricultural techniques such as propagating plants. Some end-effector designs may also be inspired by nature, as the biomimicry work that utilizes a magnetic gripper to resemble the motion of Venus flytrap.

Alternative Methods for Water Potential Measurements

The importance of water potential measurements for optimizing irrigation patterns has opened up several alternative research endeavors recently. Some of these newly proposed methods rely on remote sensing and the premises of spectral reflectance or multi-spectral imaging to determine water potential. Their greatest values are their non-invasive characteristic, much like the pressure chamber method, and scalability since these methods are intended for a faster alternative to the pressure chamber for mass assessment. Though initially promising, these methods are highly sensitive to an intractable external factor, light variability due to weather and solar motion. Zhao et al. mounted multi-spectral cameras on a small UAV to take high-resolution multi-spectral images of orchards for SWP prediction using the canopy Normalized Difference Vegetation Index (NDVI), but mentioned the high variability in data collected from different flights within the same day due to solar motion. Vila et al. used remote sensors and spectral reflectance as a proxy for SWP measurements, but had a low correlation coefficient and thus concluded this method cannot serve as a replacement for the pressure chamber method. The concepts of spectral reflectance and imaging may not be matured yet for this application, but they have provided inspiration on how to approach imaging xylem cross sections.

SUMMARY

Disclosed herein is a robotic means to autonomously select, cut, and retrieve a leaf sample for future robotic leaf water potential measurement and analysis. A visual perception algorithm is developed to detect a candidate leaf and designed and fabricated a new end-effector to cleanly cut leaves at their stem and retrieve them for further analysis. These components are integrated onto a six degree of freedom robotic arm to automate the leaf retrieval process. Results demonstrate the proposed method can successfully identify, localize, cut, and retrieve leaves from live Avocado trees.

In some embodiments, a specialized end-effector is combined with a visual perception system that detects the center of a leaf and estimates the position of the leaf's tip and stem (FIG. 1). The end-effector can cleanly cut the stem of the leaf to preserve the sample for further steps in leaf water potential analysis. Unlike the MDA approach, a stereo camera and classical computer vision methods are used to identify the centroid of the leaf and then estimate the position of the leaf stem and tip. Overall, the system's ability to detect, localize, cut leaf stems, and retain the leaf to enable future automated leaf water potential analysis in tree crops are demonstrated.

Disclosed herein is a technique for detecting and localizing candidate leaves using point cloud data from a depth camera. This technique is tested on both indoor and outdoor point clouds from avocado trees. A custom-built leaf-cutting end-effector on a 6-DOF robotic arm is used to test the proposed detection and localization technique by cutting leaves from an avocado tree. Experimental testing with a real avocado tree demonstrates the proposed approach can enable the mobile manipulator and custom end-effector system to successfully detect, localize, and cut leaves.

In some embodiments, a leaf-cutting end-effector is combined with a visual perception system that detects the center of a leaf and estimates its 6D pose (FIG. 12). The end-effector can cut and capture leaves of several common tree crops, such as avocado, clementine, grapefruit, and lemon. Unlike the MDA approach, a depth camera and a 3D point cloud are used to identify the centroid of the leaf and then estimate its 6D pose. Disclosed herein is the perception and actuation process to detect, localize, and cut leaves at their stem while retaining them, to enable future automated leaf water potential analysis in tree crops.

In some embodiments, the contributions to the domain of agricultural robotic end-effectors include: mechanism design to cleanly cut the stem of a leaf and retain it, perception component selection and design to co-optimize actuation and perception, as well as mechatronics design to enable safe and repeatable automated stem leaf cutting. An example, prototype end-effector's efficacy is evaluated by cutting leaves, which are then used for stem water potential analysis, and compared to a manually cut leaf benchmark through macro images obtained via a camera attached to a Scholander pressure chamber.

In some embodiments, the developed end-effector focuses on the actuation and perception techniques to cut and retain a leaf. This task has received much less attention by existing robotic harvesting/leaf sampling technology yet an important aspect toward enabling future robotic leaf water potential measurements.

In some embodiments, while several steps remain before automating the full SWP analysis, disclosed herein are the first steps in defining key system metrics. A custom end-effector is developed, and the force and rate required to cleanly cut a leaf stem for analysis are determined. This end-effector also contains a method for capturing the leaf and camera placement that will aid in leaf detection and visual servoing research. A pneumatic version of the end-effector is also developed, and its performance is determined. Finally, manually cut leaves and end-effector-cut leaves to establish a performance baseline are compared.

(a) The detection algorithm selects a candidate leaf. (b) The arm moves the end-effector to an offset pose aligned with the leaf stem. (c) The end-effector performs a linear motion to position the cutting blades around the leaf stem, and cuts it. (d) After cutting, the leaf falls into the end-effector. The dashed blue circle tracks the location of the leaf throughout the process.

Figure 12:
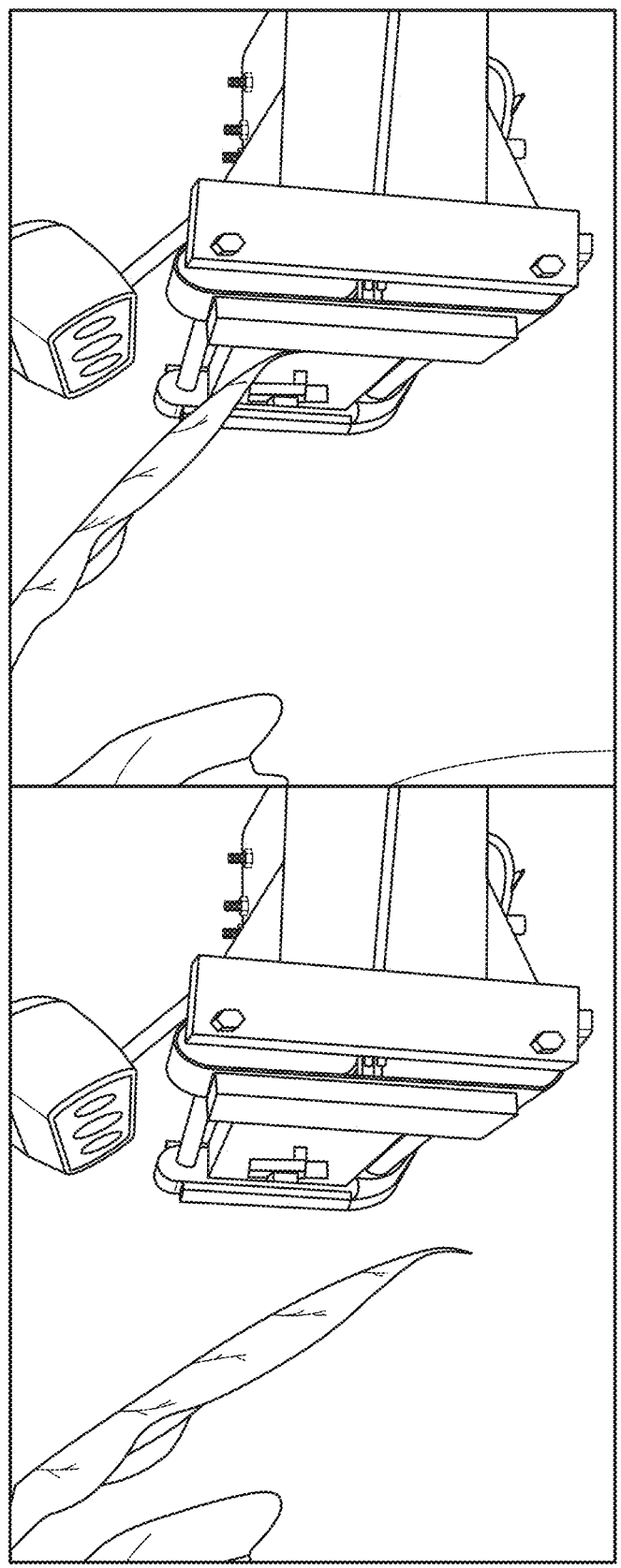

FIG. 12 depicts an example custom-built end-effector attached to an off-the-shelf 6-DOF robotic arm and a visual perception algorithm to detect, localize, and cut leaves at their stem. In some aspects, it incorporates pneumatic suction, allowing for capture of the leaf even if it is misaligned.

Figure 13A:
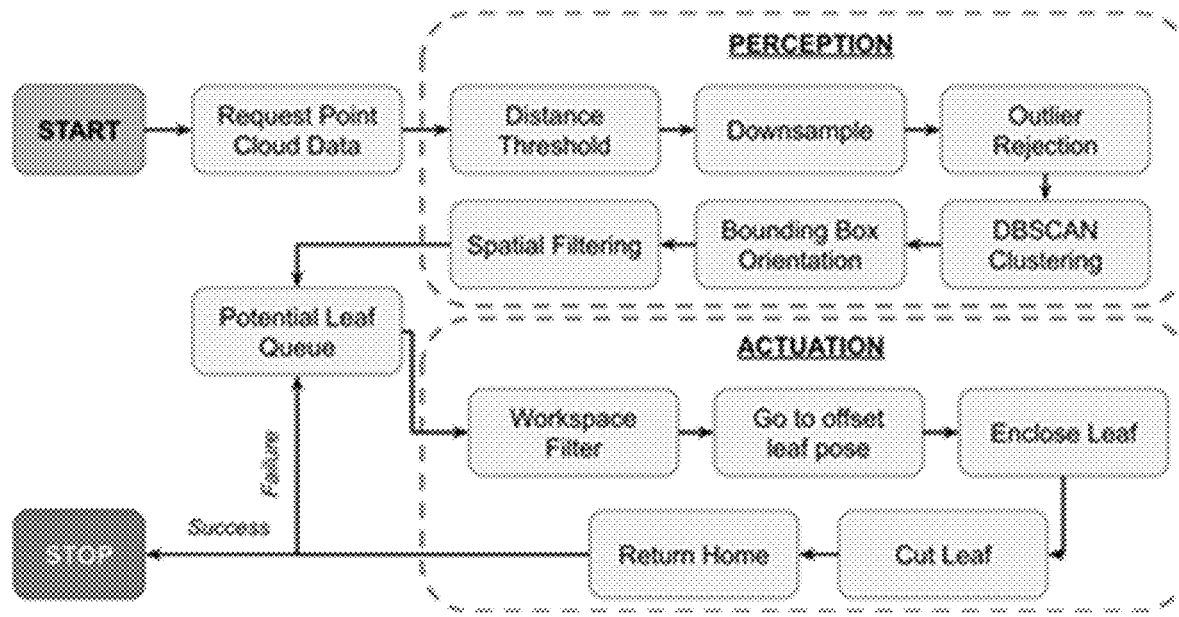

FIG. 13A depicts example perception and non-pneumatic actuation steps. The approach jointly considers perception and actuation. The perception module processes point cloud data to segment leaves and deposit leaf candidates into a queue. Candidate leaves are then passed to the robot arm controller to actuate the end-effector. If a cut is successful, the routine ends. If unsuccessful, the arm controller requests the next leaf in the queue.

Figure 13B:
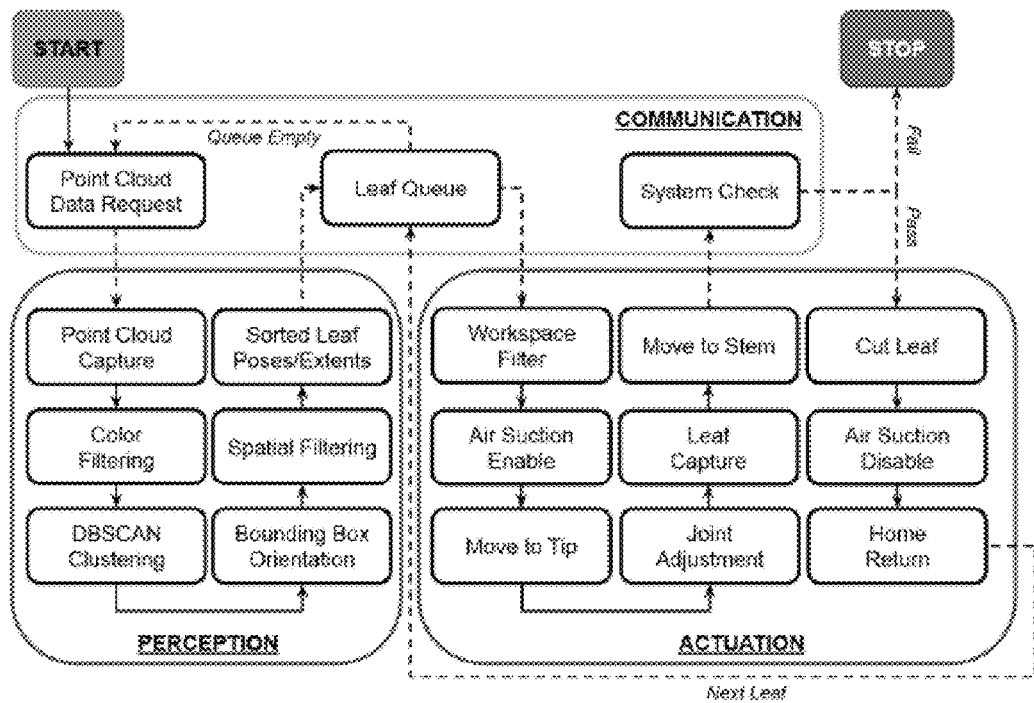

FIG. 13B depicts example perception and pneumatic actuation steps. The approach triggers suction at the start of actuation and turns it off at the end.

Figure 14A:
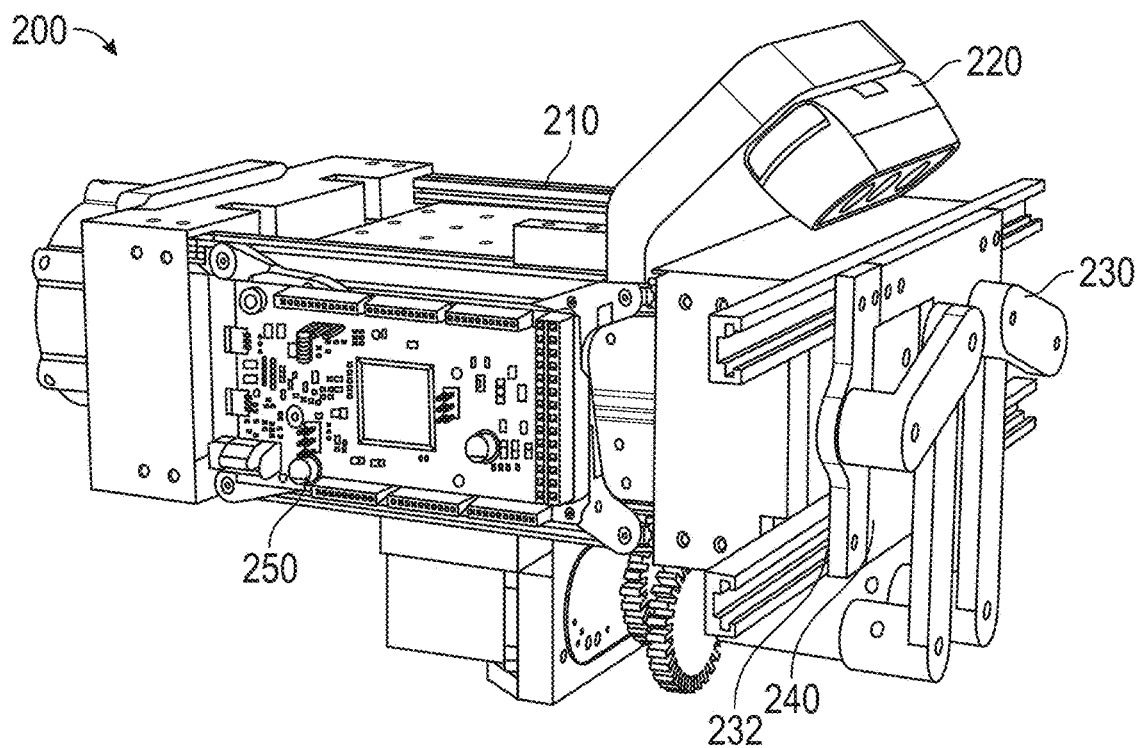

FIG. 14A depicts an example non-pneumatic end-effector containing the components necessary to cut a leaf from a tree. The servo motor (red) actuates a double four-bar mechanism (yellow) that closes a set of gates (blue) with a razor blade to cut and capture a leaf. An Intel RealSense camera D435i is mounted on the top of the end-effector for perception. A microcontroller is mounted on the arm for controlling the motor. This end-effector can be mounted to a robotic arm using an adaptor plate (green).

Figure 14B:
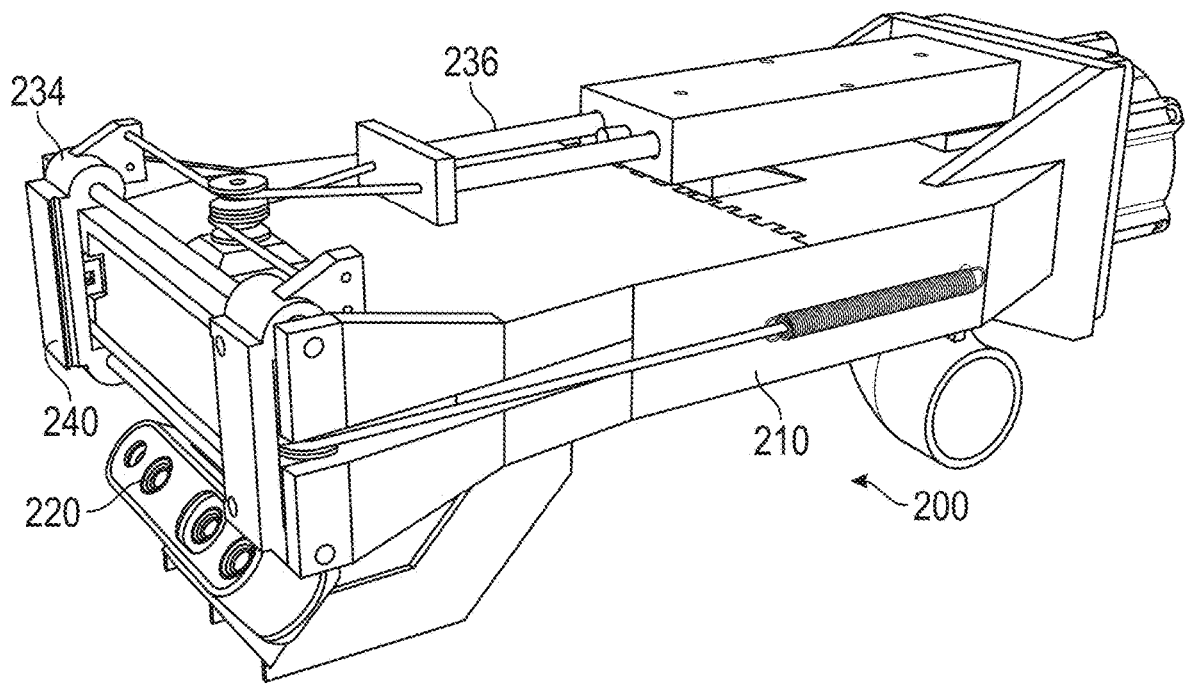

FIG. 14B depicts an example pneumatic end-effector containing the components necessary to cut a leaf from a tree. The end-effector body (blue) can be mounted to the arm via the adaptor plate (green). The cutter (red) is mounted on linear rails and is actuated via the piston (grey) that is connected to tension strings (yellow) and pulleys (light grey). The suction tube connector (orange) is located at the back of the end-effector with direct access to the internal cavity. An Intel RealSense camera D435i is mounted on the top of the end-effector for perception. A microcontroller is mounted on the arm for controlling the actuation system.

Figure 15:
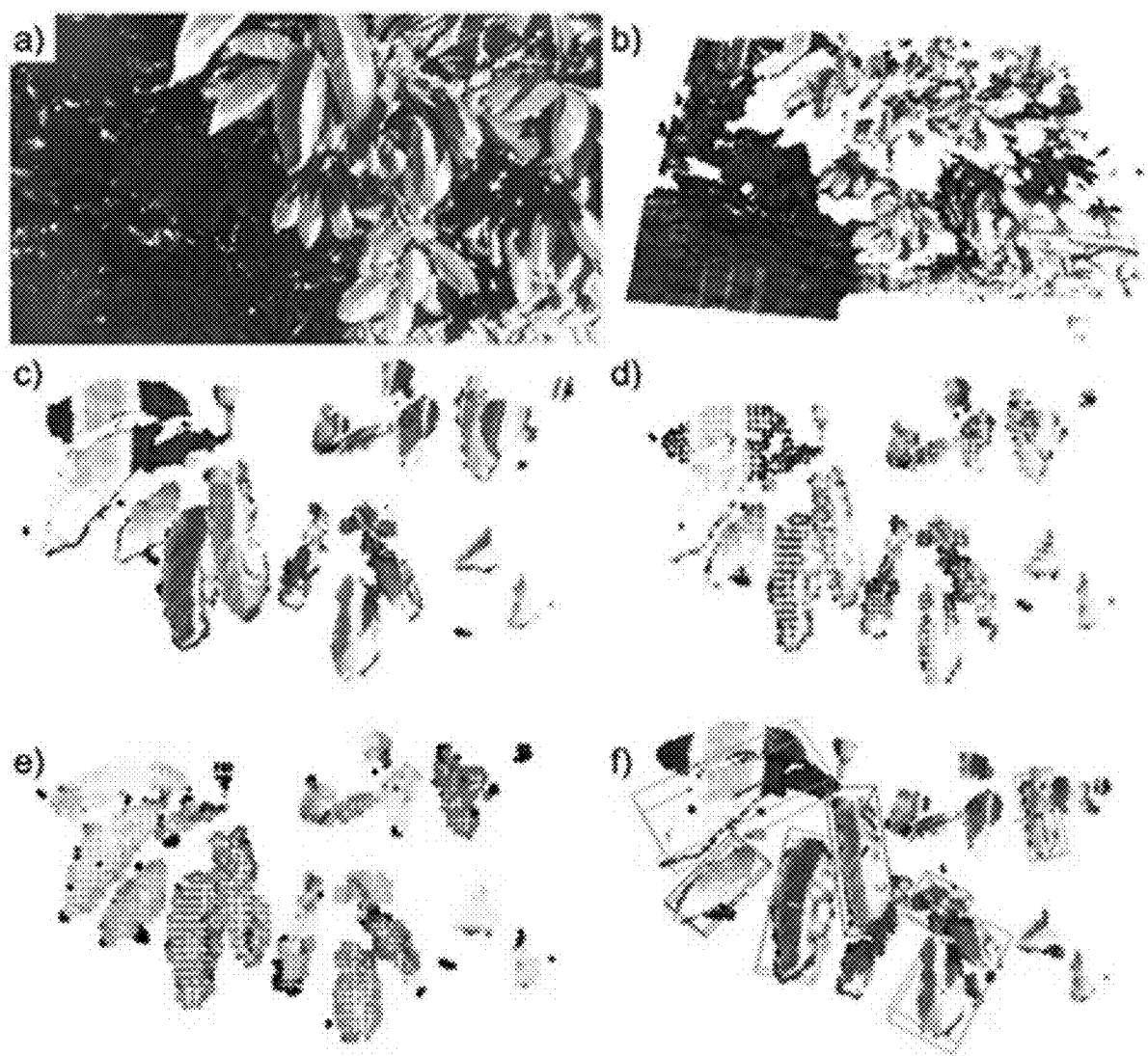

FIG. 15 depicts example key steps in the proposed leaf detection and localization process. The sample here corresponds to an outdoor point cloud: (a) corresponding RGB image of the tree, (b) raw point cloud, (c) distance filtered ROI, (d) downsampled point cloud, (e) segmented clusters, and (f) detected candidate leaves without 6D pose bounding boxes.

Figure 16:
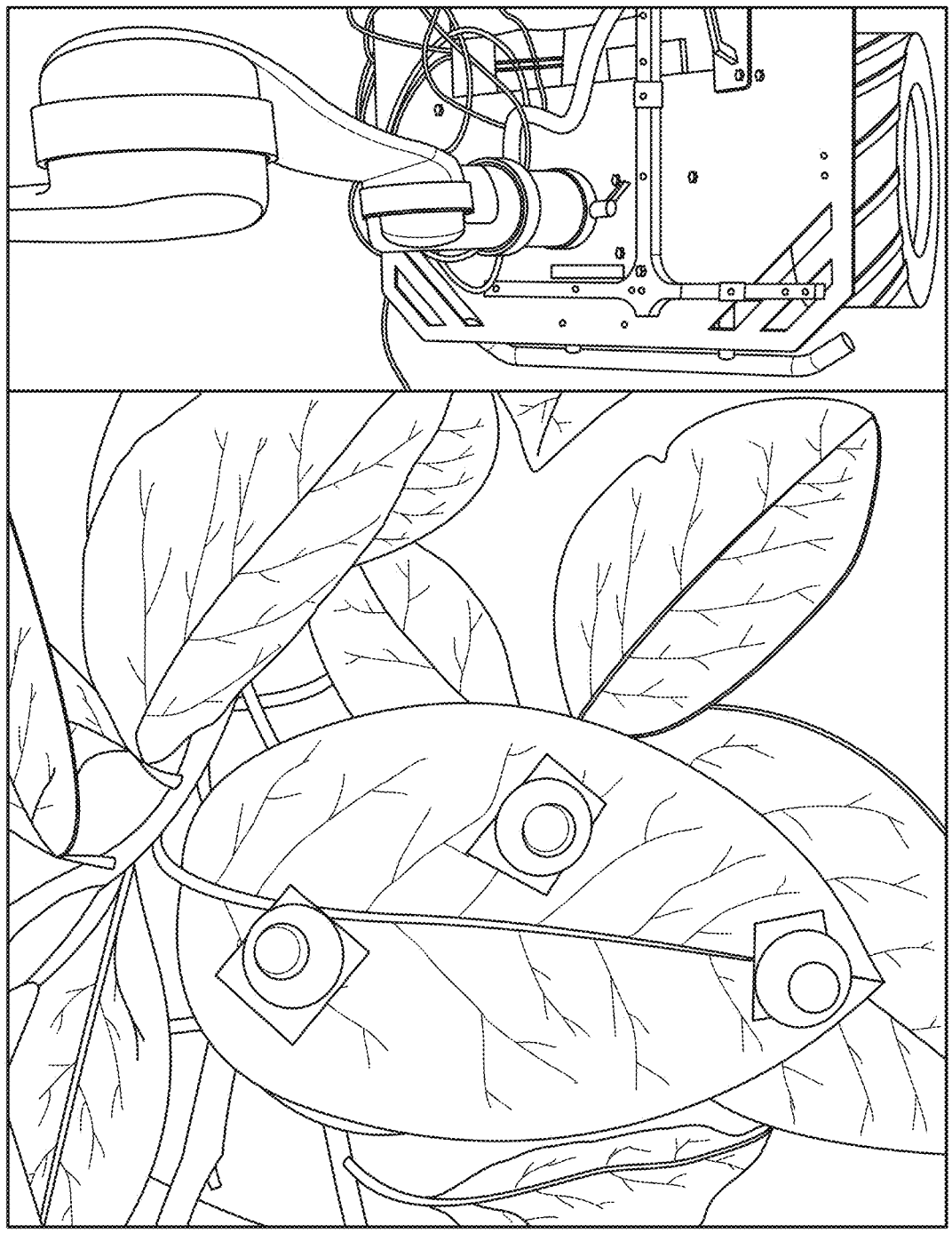

FIG. 16 depicts example motion capture to establish a ground truth for determining the leaf 6D pose. Markers were placed on a target leaf (left) with origin at the base of the 6-DOF robot (right). (A real avocado tree was used.)

Figure 17:
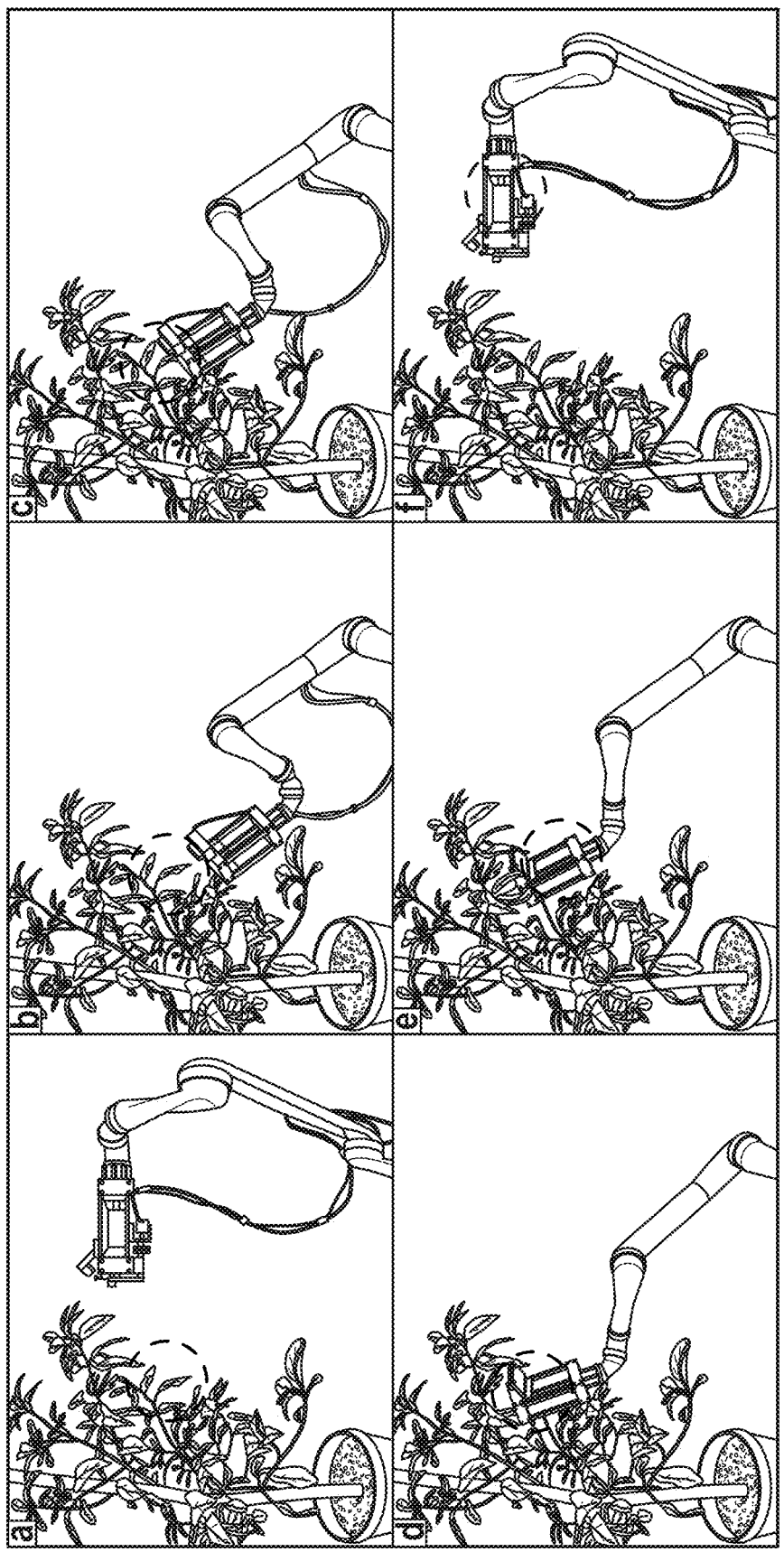

FIG. 17 depicts an example leaf retrieval process with an example prototype end-effector. During the perception phase, (a) the point cloud is processed to determine a potential leaf. If a viable leaf is detected, (b) the arm will move to an offset position. (c) The arm will then perform a linear motion to capture the leaf. Once in position, (d) the arm will cut the leaf, and (e) the leaf will fall into the enclosed chamber. (f) After completing the cut, the arm will return to the home position.

Figure 18:
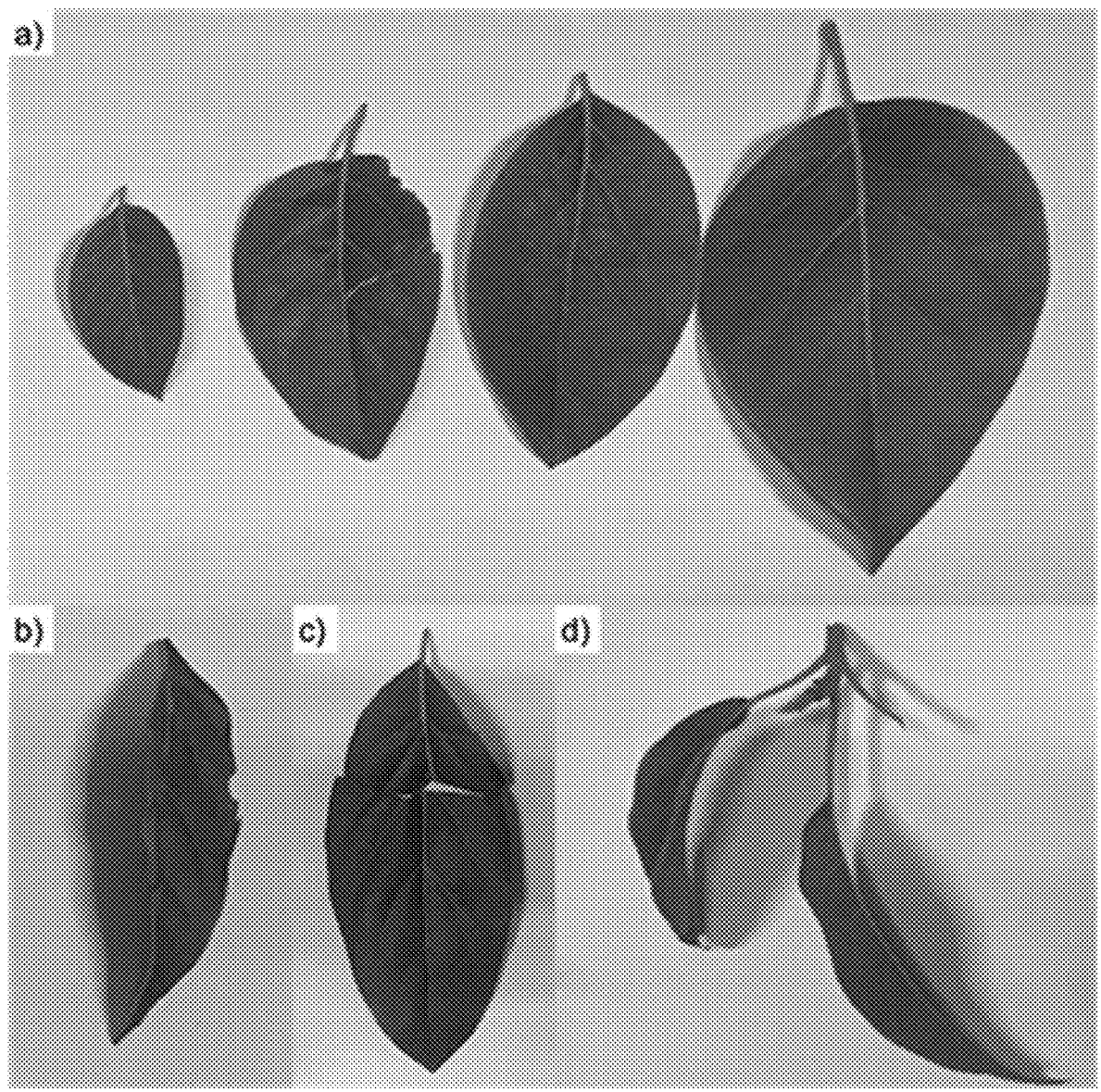

FIG. 18 depicts example sample leaves cut from the avocado tree during automated indoor tests for an example prototype. (a) The four leaves represent clean cuts suitable for stem water potential analysis. (b) The system also cuts seven leaves that were classified as near-misses, which removed the leaf without the stem. (c) The remaining leaves were cut closer to the center, due to interference between the end-effector and the branches. (d) In two cases, collateral damage occurred when a second leaf was removed along with the target leaf. These instances were classified as a single successful cut, but not a clean cut since the two leaves would need to be separated for stem water potential analysis.

Figure 19:
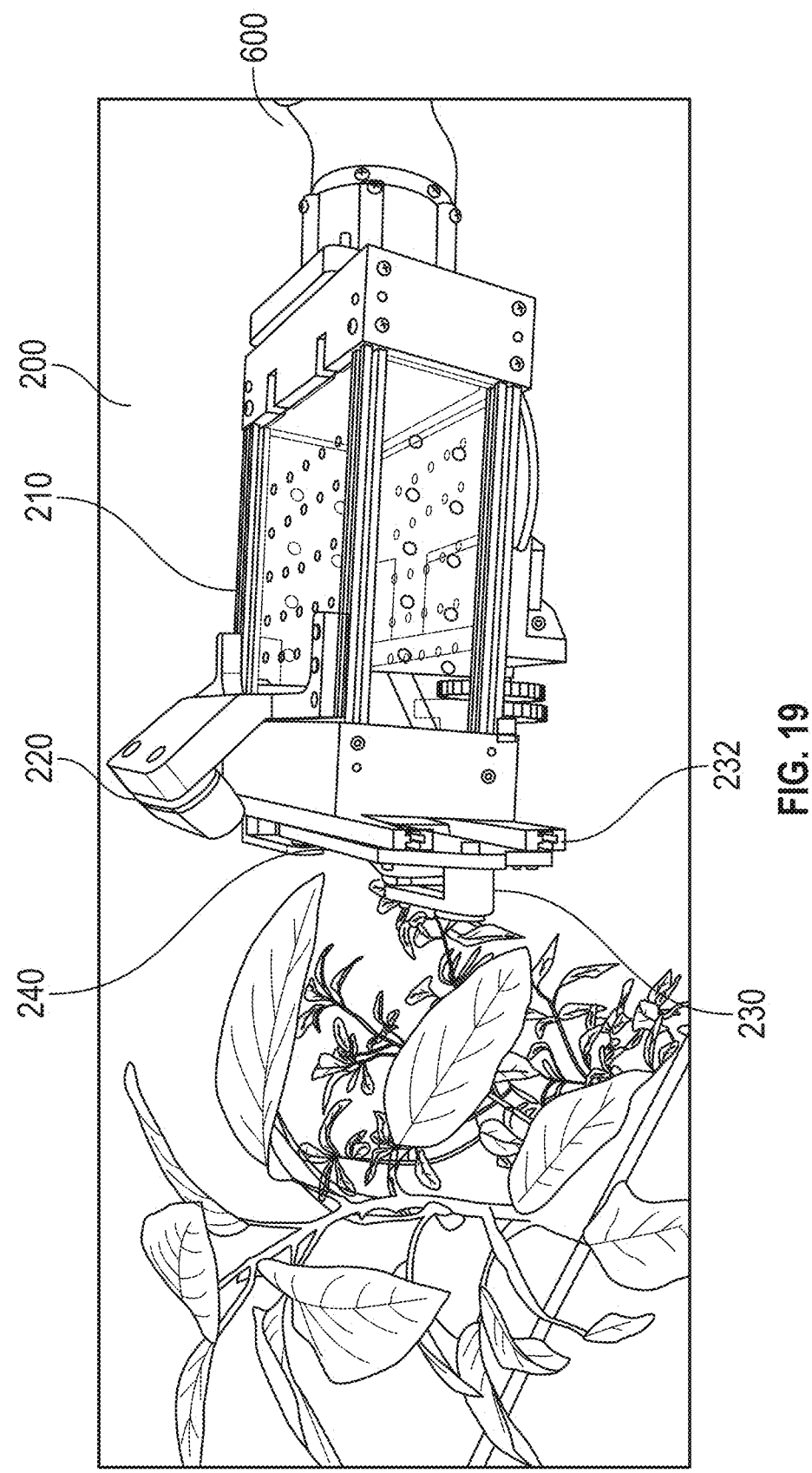

FIG. 19 depicts an example, prototype end-effector developed in this work, shown here mounted on the end of a 6-DOF robotic arm, for leaf cutting and retaining.

Figure 20:
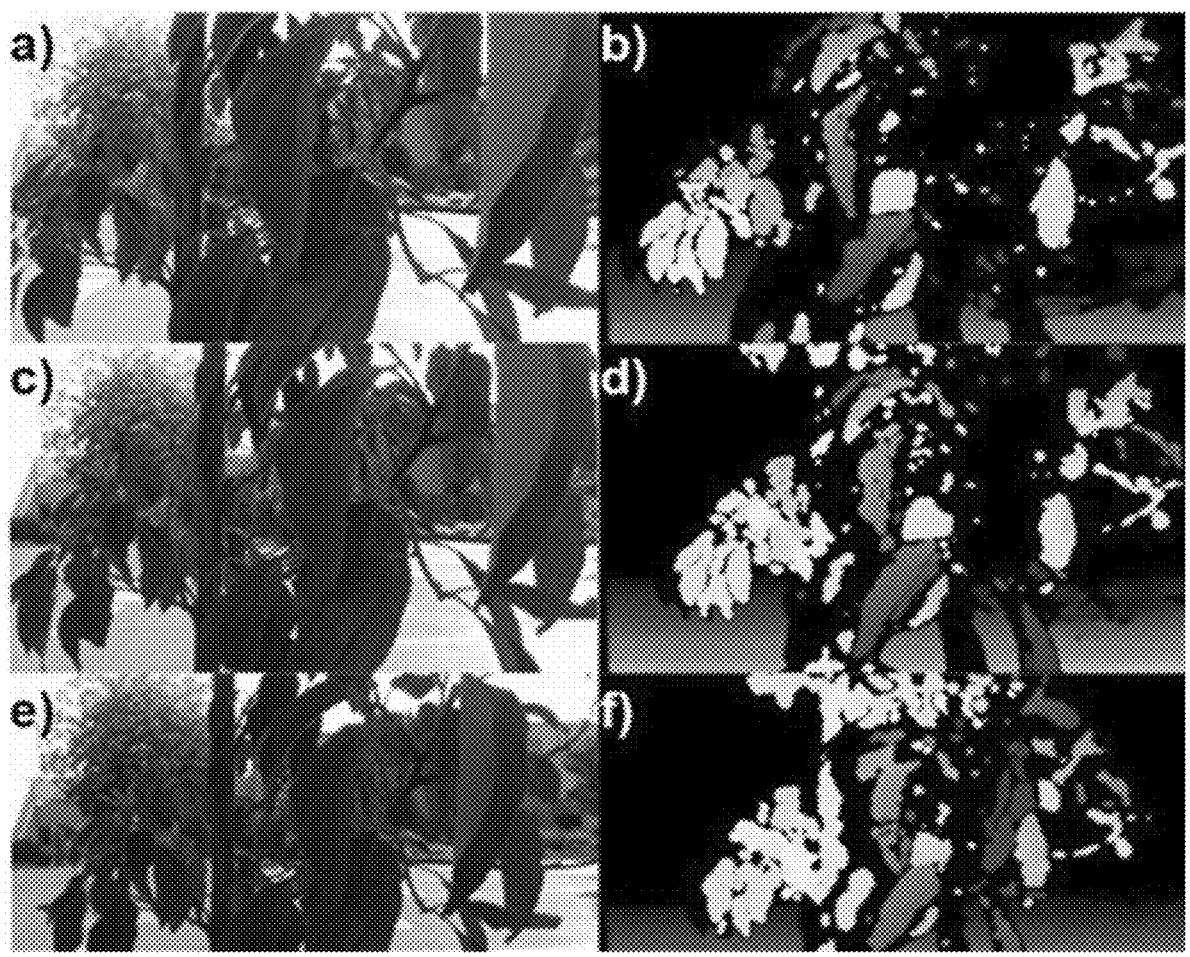

FIG. 20 depicts example RGB and depth images collected from RS D435i in an outdoor environment at (a)-(b) 15 cm, (c)-(d) 20 cm, and (e)-(f) 25 cm.

Figure 21:
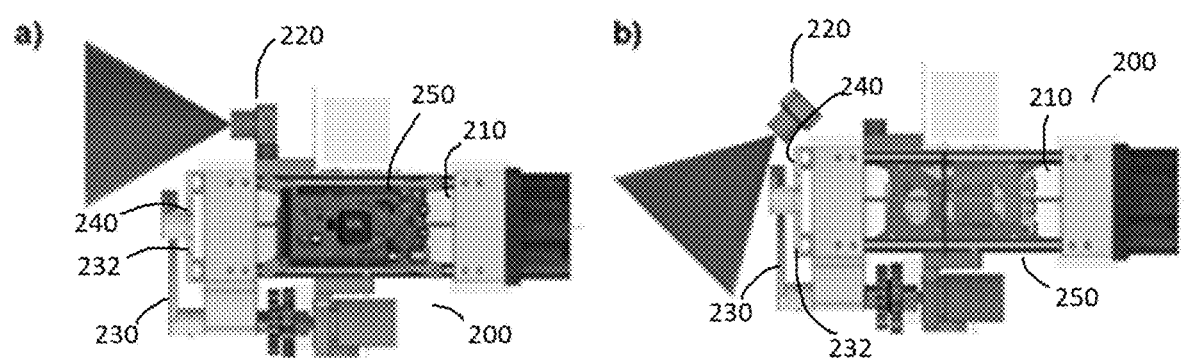

FIG. 21 depicts example camera positions for a prototype end-effector: (a) straight ahead, and (b) angled downward at 45°.

Figure 22:
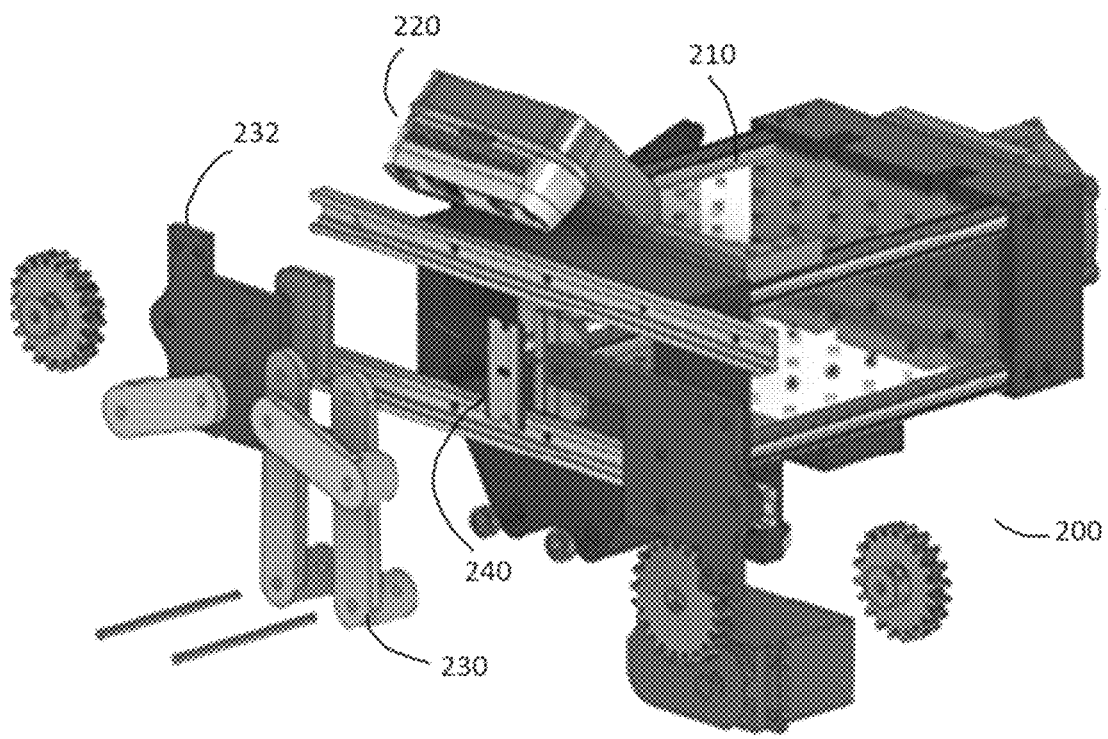

FIG. 22 depicts an example exploded view of a prototype end-effector. The design contains several critical components, including the Intel RealSense D435i Depth Camera (A) and an interchangeable robotic arm mount (B). The FEETECH FT5335M R/C servo (C) is connected via a geartrain (D) to four-bar linkages (E). This mechanism closes the gates (F) to cut the leaf with the razor blade (G). This separates the leaf from the tree and retains it within the enclosure for subsequent SWP analysis.

Figure 23:
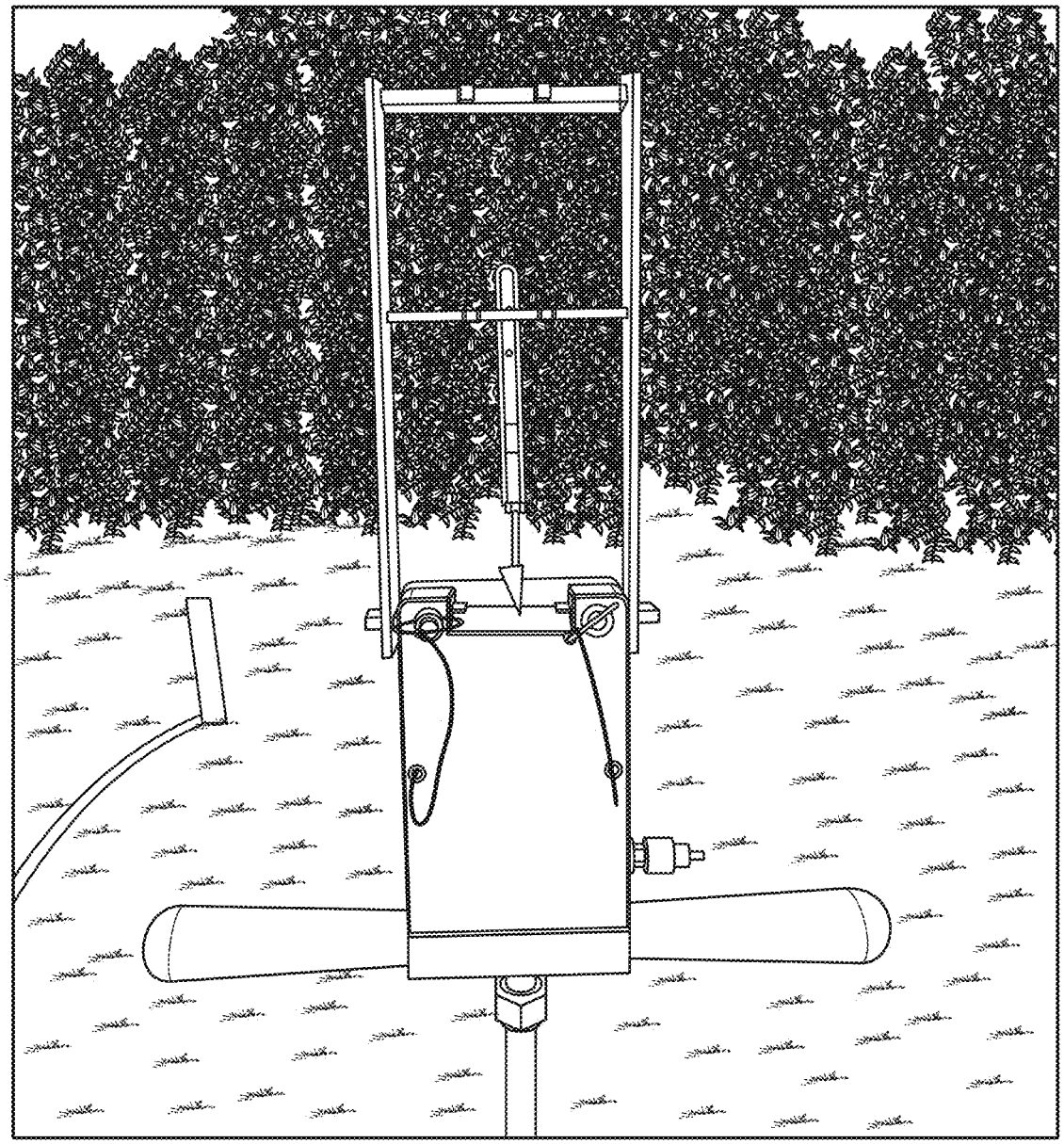

FIG. 23 depicts an example manual pump-up pressure chamber retrofitted with a camera assembly designed in this work to provide stable and clear real-time macro video feed of the xylem while operating the chamber.

Figure 24:
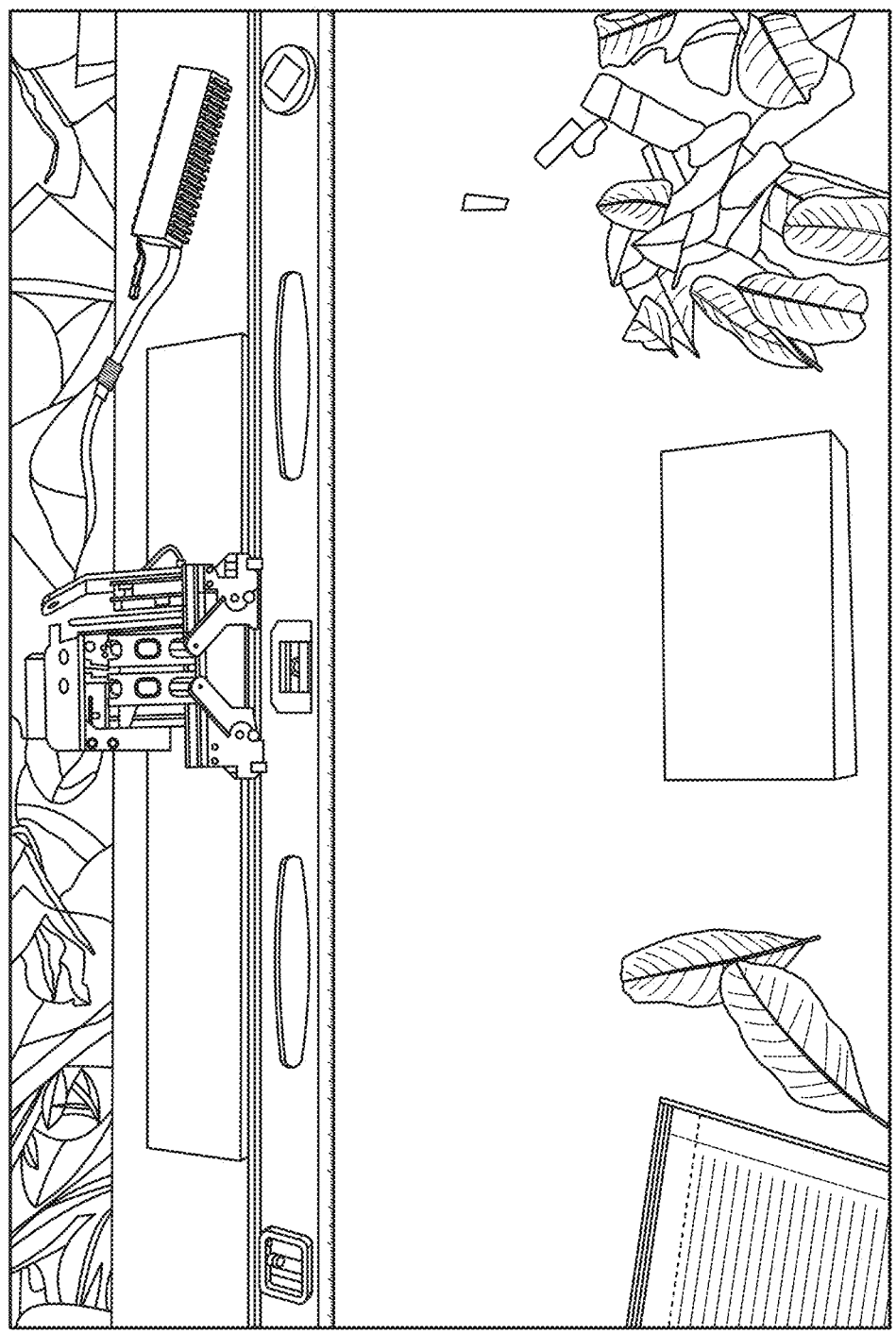

FIG. 24 depicts an example experimental setup for the leaf cutting tests. A first prototype end-effector mechanism was placed above a level. A high-speed camera was used to record the cutting operation.

Figure 25:
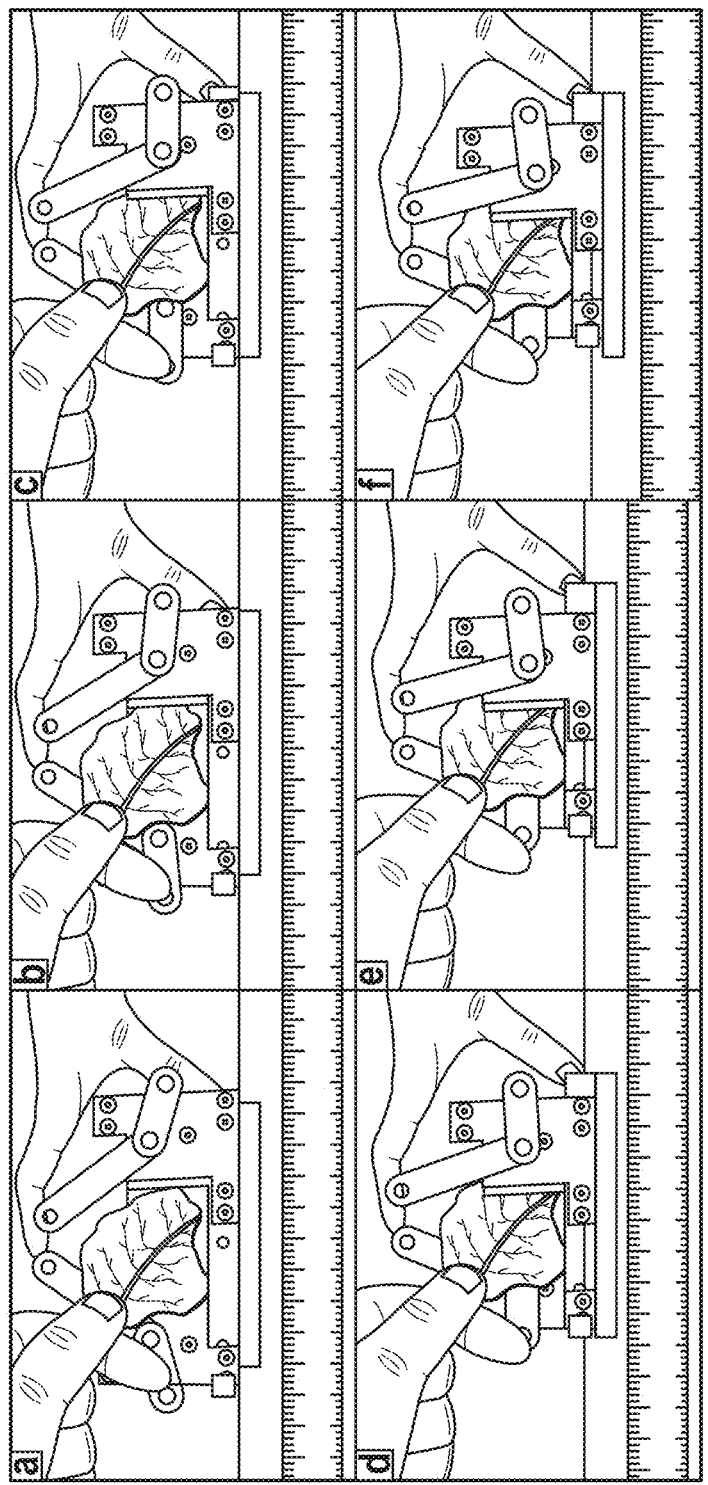

FIG. 25 depicts example frames from one test trial showing a prototype leaf cutting mechanism in action. In frame (f), the mechanism has cut the stem. In these tests, a leaf was already removed from the tree and the mechanism was tested to cut the stem.

Figure 26:
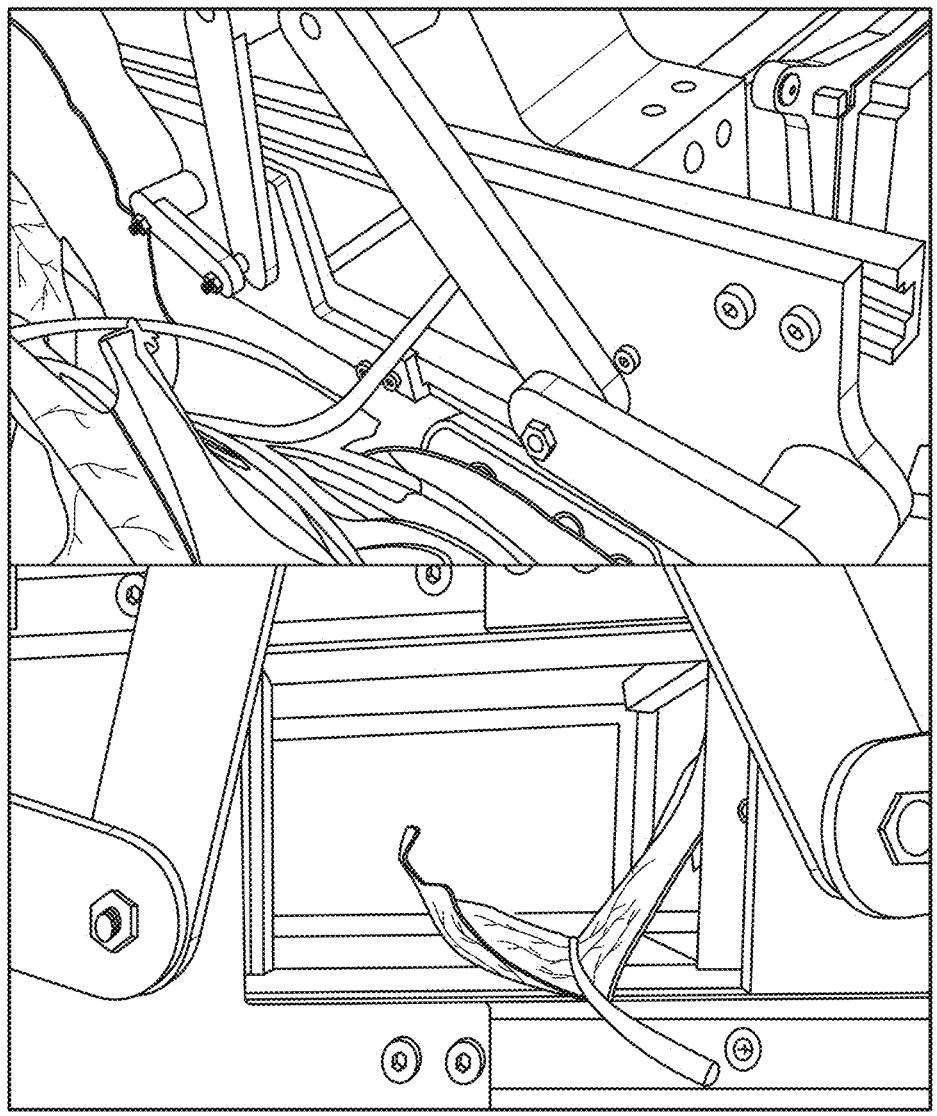

FIG. 26 depicts an example, prototype field leaf cutting test. The battery-operated end-effector was manually placed about the stem and activated by a button press on the on-board microcontroller (top). Normally, the cut leaf falls into the end effector for retention, but the stem was pulled out for visual inspection (bottom).

Figure 27:
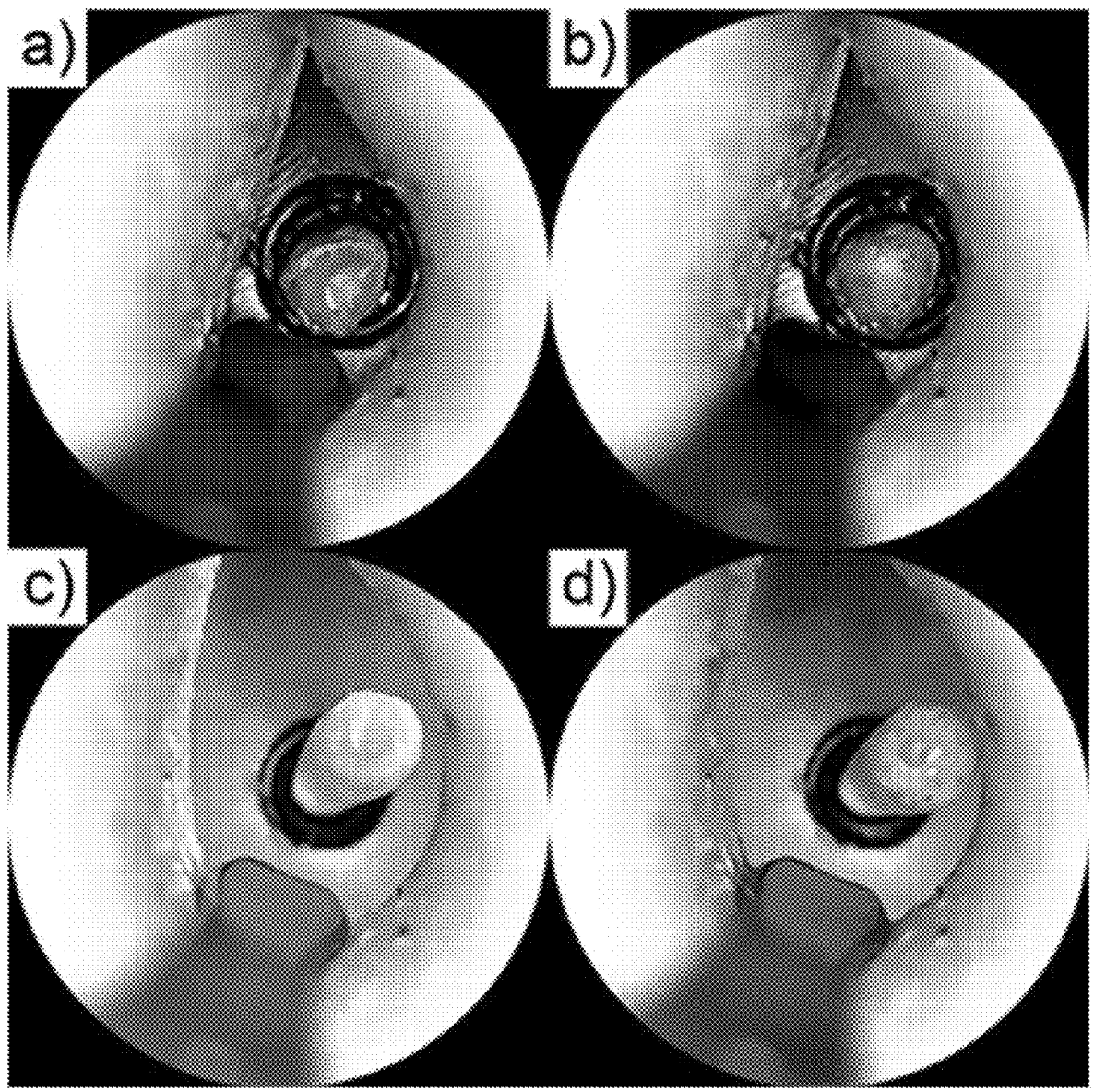

FIG. 27 depicts example comparisons of xylem initial and final states for manual and end-effector cut stems. (a) and (b) are initial and final states for the manual cut respectively. (c) and (d) initial and final states for the end-effector cut.

Figure 28:
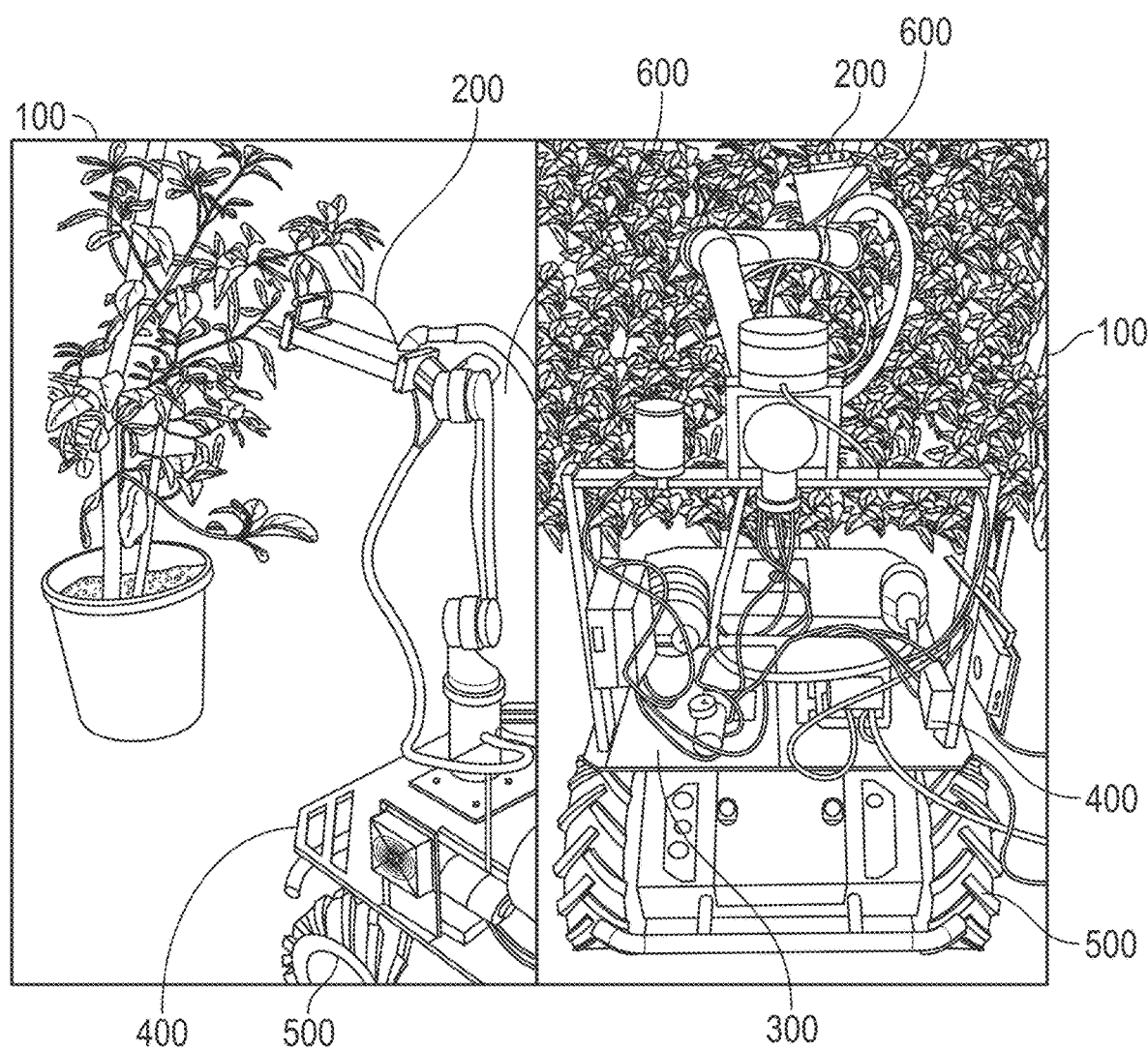

FIG. 28 depicts example snapshots from a test trial showing an example pneumatic leaf cutting mechanism in action. One image (left) depicts the indoor experiments, while the other (right) depicts the outdoor experiments.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example 1

Figure 1:
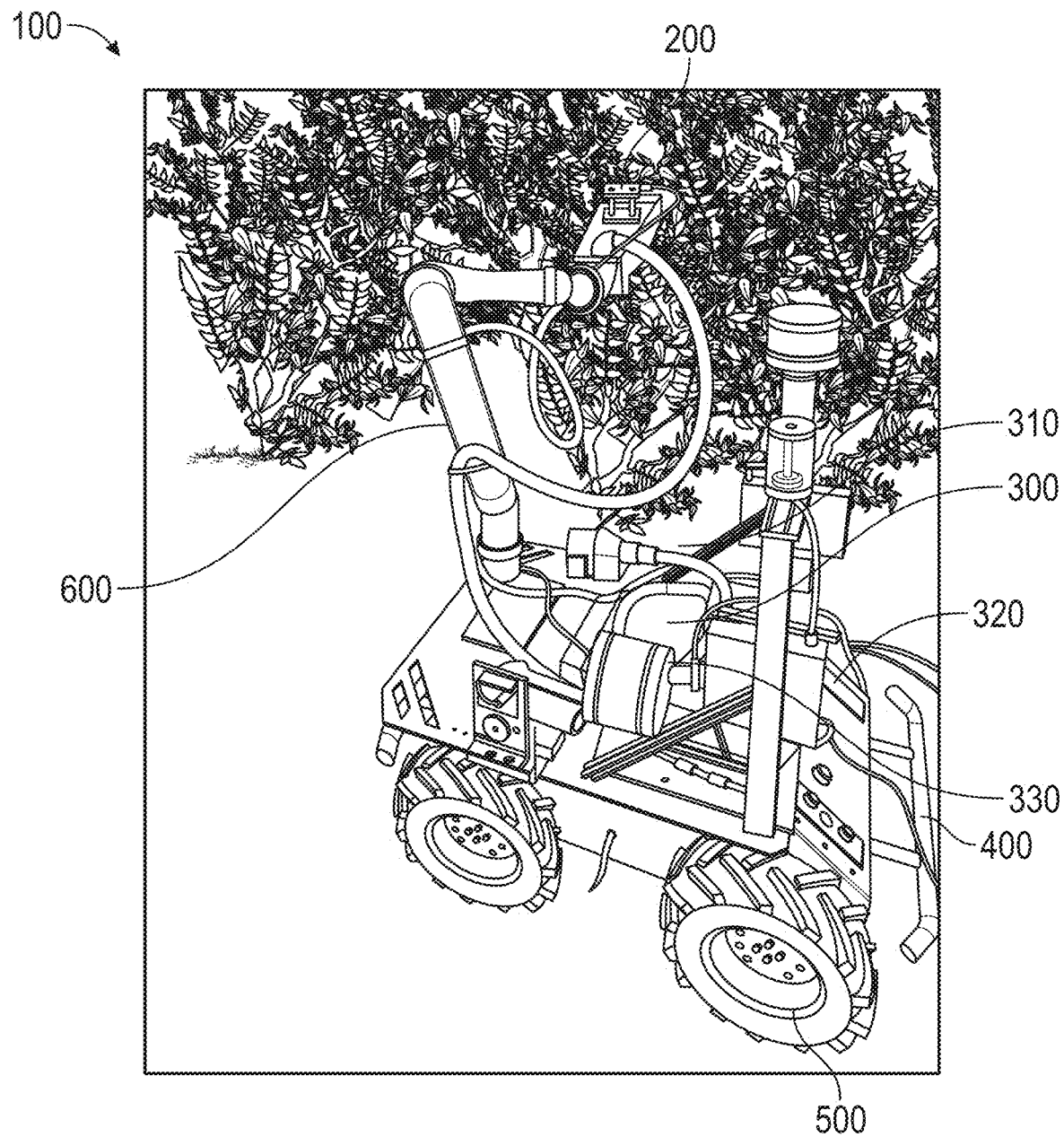
FIG. 1 depicts an example leaf detection and extraction system utilizing a custom-built end-effector attached to an off-the-shelf mobile manipulator to cleanly cut leaves at their stems.
Figure 2:
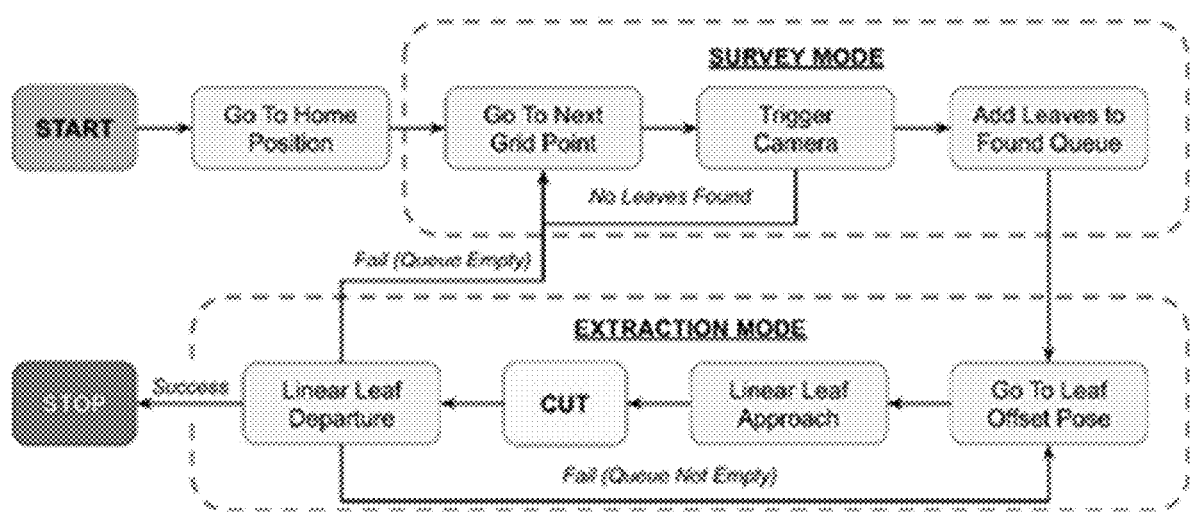
FIG. 2 depicts an example overview of the complete leaf extraction pipeline proposed in this work. The two key contributions of this work include the visual perception algorithm to detect and localize leaves, and the hardware design of a specialized end-effector to cleanly cut leaves at their stem and retain them.

The proposed leaf detection and extraction approach hinges on three key steps: 1) End-effector path planning toward candidate leaves and leaf extraction logic; 2) Vision-based detection and localization of a candidate leaf; and 3) Cutting the candidate leaf at its stem and retaining it. The overall system's algorithmic flow is shown in FIG. 2. Data from a stereo camera 220 (e.g., Stereolabs ZED Mini) are utilized for the visual perception algorithm developed herein. A custom-built stem-cutting end-effector 200 is designed and retrofitted on a mobile (in some embodiments, on wheels 500) manipulation base platform 400 (Kinova Gen-2 six degree of freedom (6-DOF) robot arm 600 mounted on a Clearpath Robotics Husky wheeled robot). Path planning for the 6-DoF arm is based on MoveIt!.

In the remainder of this section, the approach to achieve the aforementioned steps is described. The key contributions of this work are the computer vision algorithm for identifying the leaf and the hardware design for the cutting mechanism.

End-Effector Path Planning and Leaf Extraction Logic

Figure 5A:
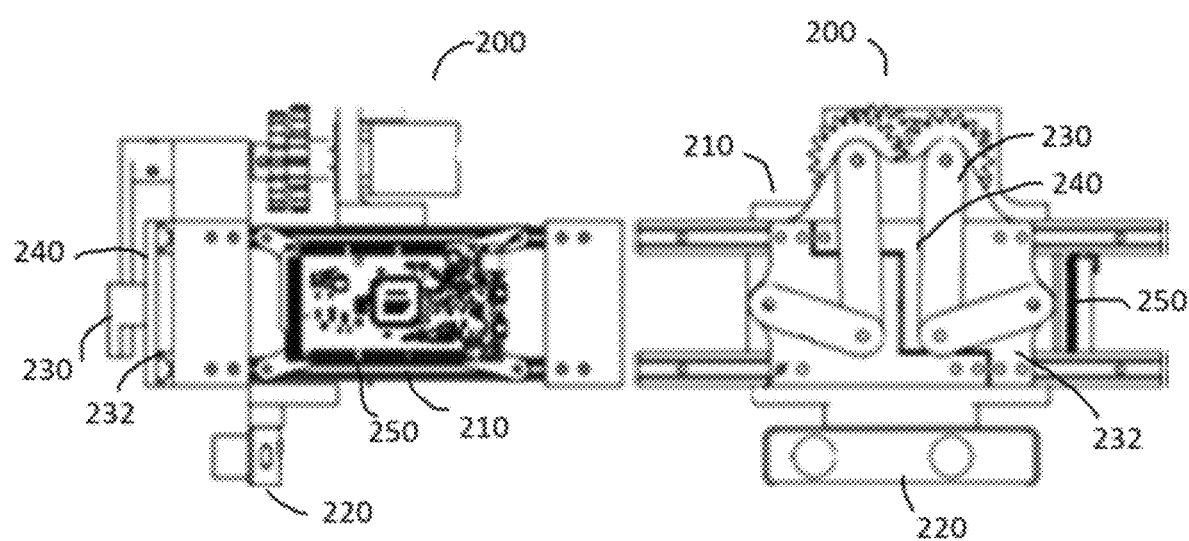
FIG. 5A depicts example views of a non-pneumatic end-effector assembly. Left: Side view of the end-effector's assembly. Right: Front view of the assembly.
Figure 5B:
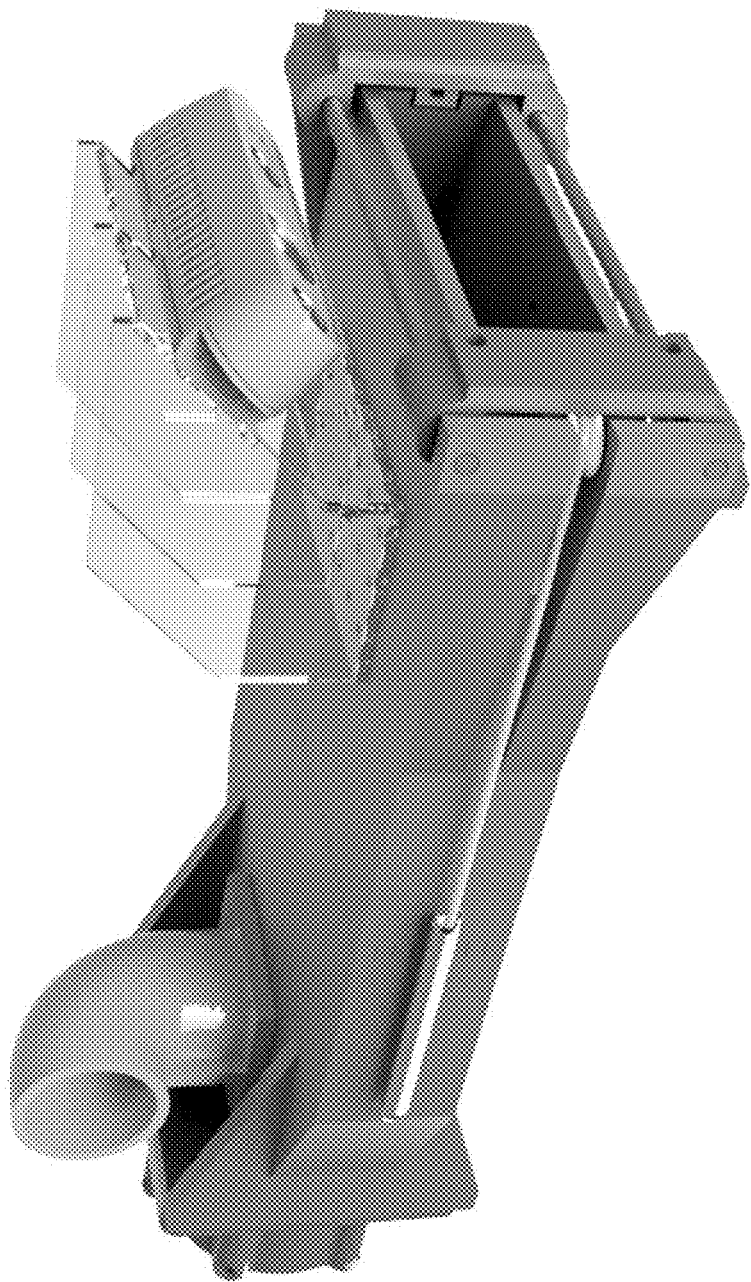
FIGS. 5B and 5C depict example views of a pneumatic end-effector assembly.
Figure 5C:
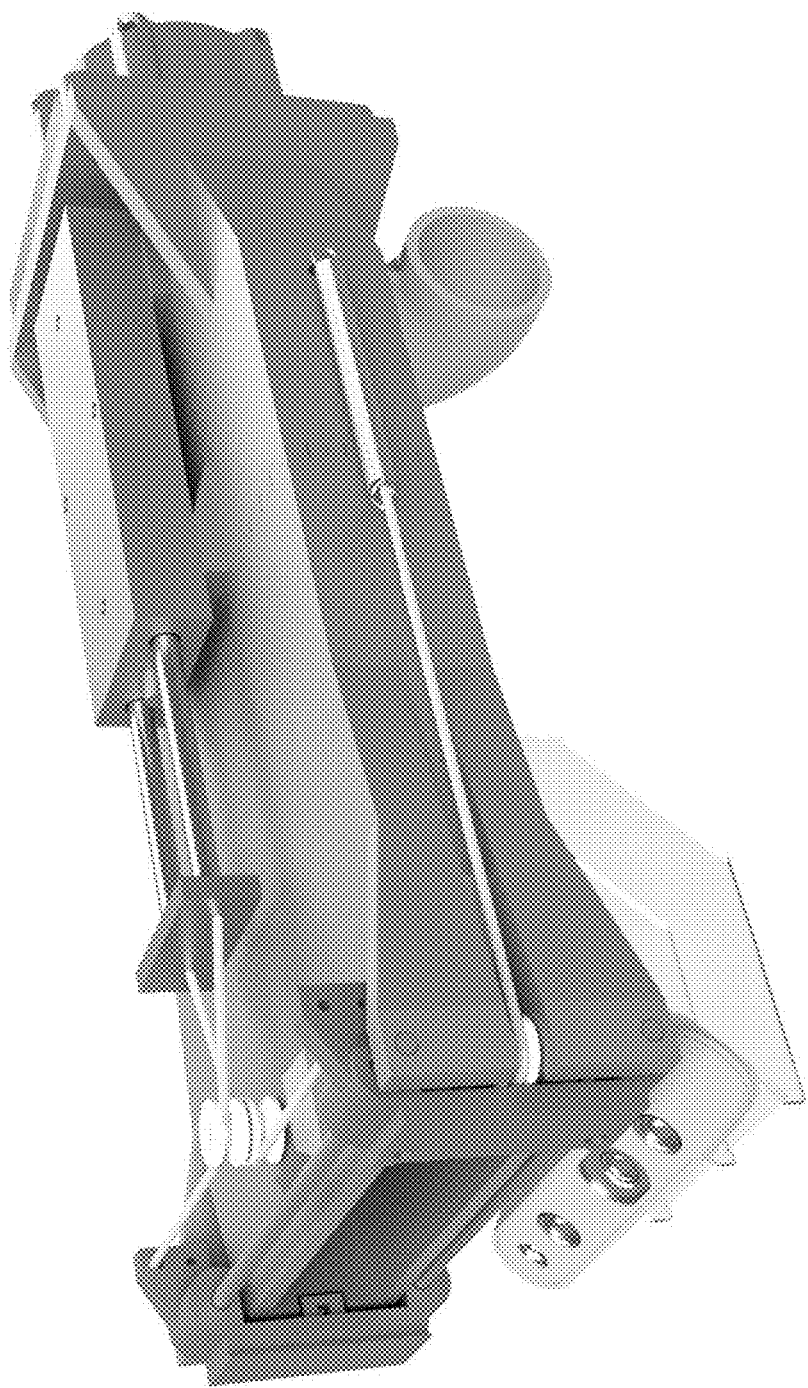
Figure 5D:
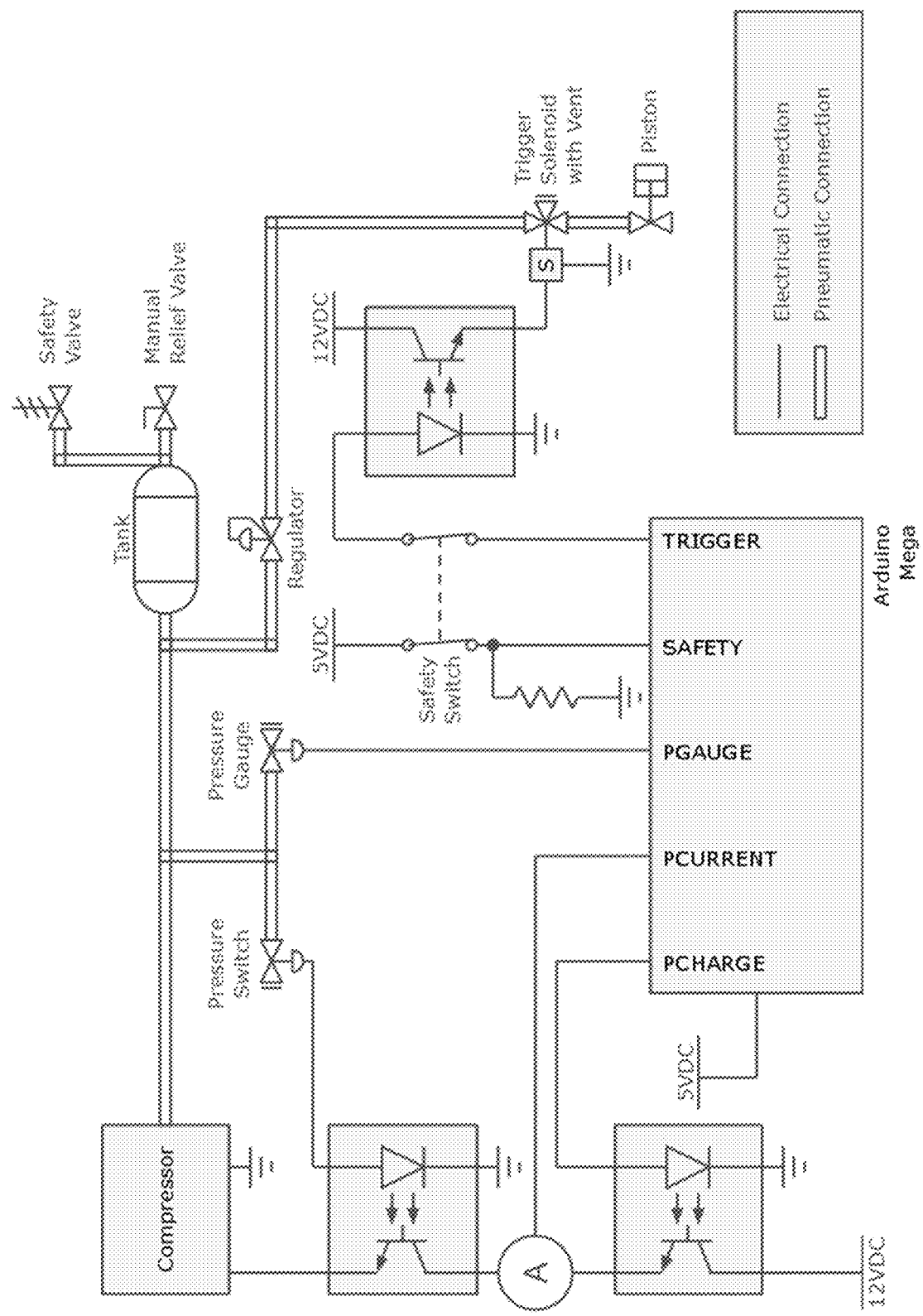
FIG. 5D depicts an example electrical circuit for a pneumatic end-effector assembly.

The arm's motion controller operates between two primary modes: survey and extraction. In survey mode, the arm 600 moves the end-effector 200 through nine points in a 3×3 search grid to identify potential leaf candidates. At each point, the arm 600 pauses, and the position of each viable leaf is identified using the visual perception algorithm described herein and then appended to a queue of potential leaf candidates. If the queue is empty, the arm 600 moves to the next position in the search grid. If viable sample candidates are found, the arm 600 transitions to extraction mode to retrieve a leaf sample. At the start of the extraction mode, the robotic arm 600 moves the end-effector 200 to an offset pose inline with the central axis of the stem and enables air suction via the pneumatic subsystem 300. At this stage of development, the localization algorithm provides the 3D-position of the leaf, and hence the planner assumes the average leaf hangs from the tree at a 45° angle. (Part of future work focuses on recovering 3D leaf orientation as well.) After reaching an offset pose set at approximately 0.2 m from the leaf centroid, the arm 600 performs a linear Cartesian move toward the leaf. (This distance depends on the employed stereo camera's minimum range.) An overshoot distance based upon the average distance between the leaf centroid and stem is added to this Cartesian move calculation to ensure that the end-effector's chamber 210 surrounds the leaf and the razor blade 240 at the chamber aligns with the stem. Once in position, the system prompts the operator to confirm the cutting operation. (If aborted, the system automatically attempts the next leaf in the queue.) After the cut, air suction is disabled, and the arm 600 departs from the leaf position with another linear Cartesian move back to the offset position. Once at the offset position and clear from the other leaves in the canopy, the arm 600 returns to its home position. FIG. 5D depicts an example electrical circuit for a pneumatic end-effector assembly.

Leaf Detection and Localization

Figure 3:
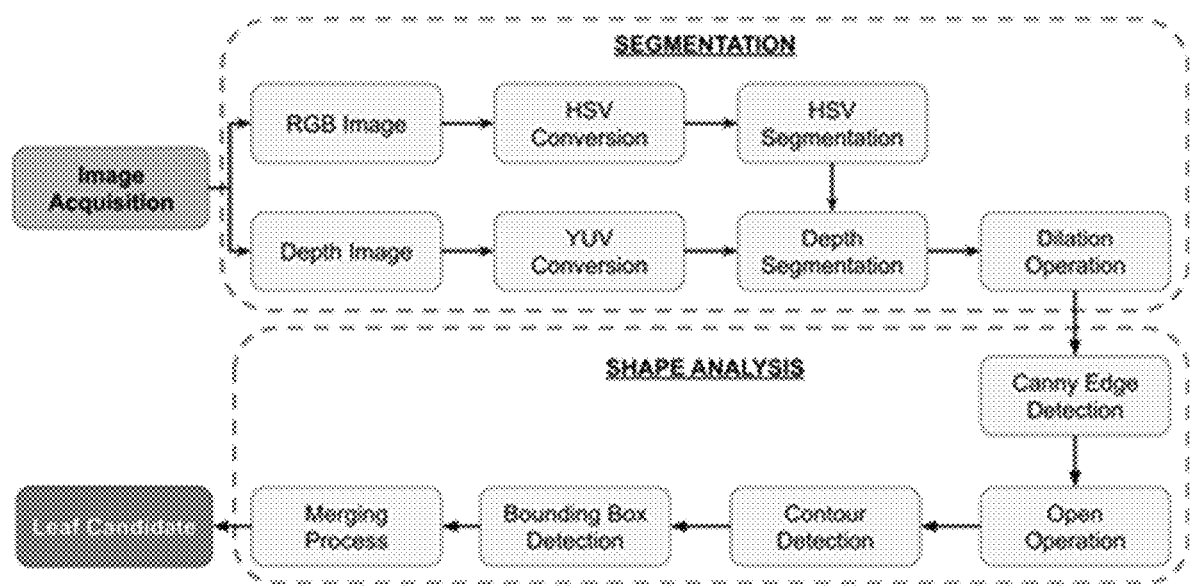
FIG. 3 depicts an example flow diagram of the developed visual perception algorithm for candidate leaf detection and localization.

A visual perception system that performs leaf detection and localization uses an RGB-D stereo camera. The flow diagram of the visual perception algorithm is shown in FIG. 3. The leaf detection approach is divided into two steps. First, in one example, both the left and right RGB and depth images are acquired from the ZED Mini stereo camera 220 with a resolution of 1080×1920 and converted respectively to the HSV and YUV color spaces. The HSV conversion is set to highlight the green component in the RGB images as the YUV provides a better reading of the depth image through its Y component. Two-tiered segmentation is performed, first based on the HSV threshold to extract all tree leaves and then based on depth information to obtain leaves on the foreground. A dilation operation is applied on the obtained masked image to smooth the edges of the leaves.

Next, the edges of the detected region are provided through a Canny edge detector and processed with an opening morphological operation. From there, a first classification process is performed to extract the leaf contours information and retain only closed edges with high intensity and a maximum area for detecting bounding boxes. The output of the first classification is fed into a second classification to detect bounding boxes, which includes height/width ratio and orientation of the bounding boxes to provide the robot only with the accessible leaves. The parameters used herein were selected through multiple trials and provide better performance than adaptive thresholding techniques such as Otsu's method.

Figure 4:
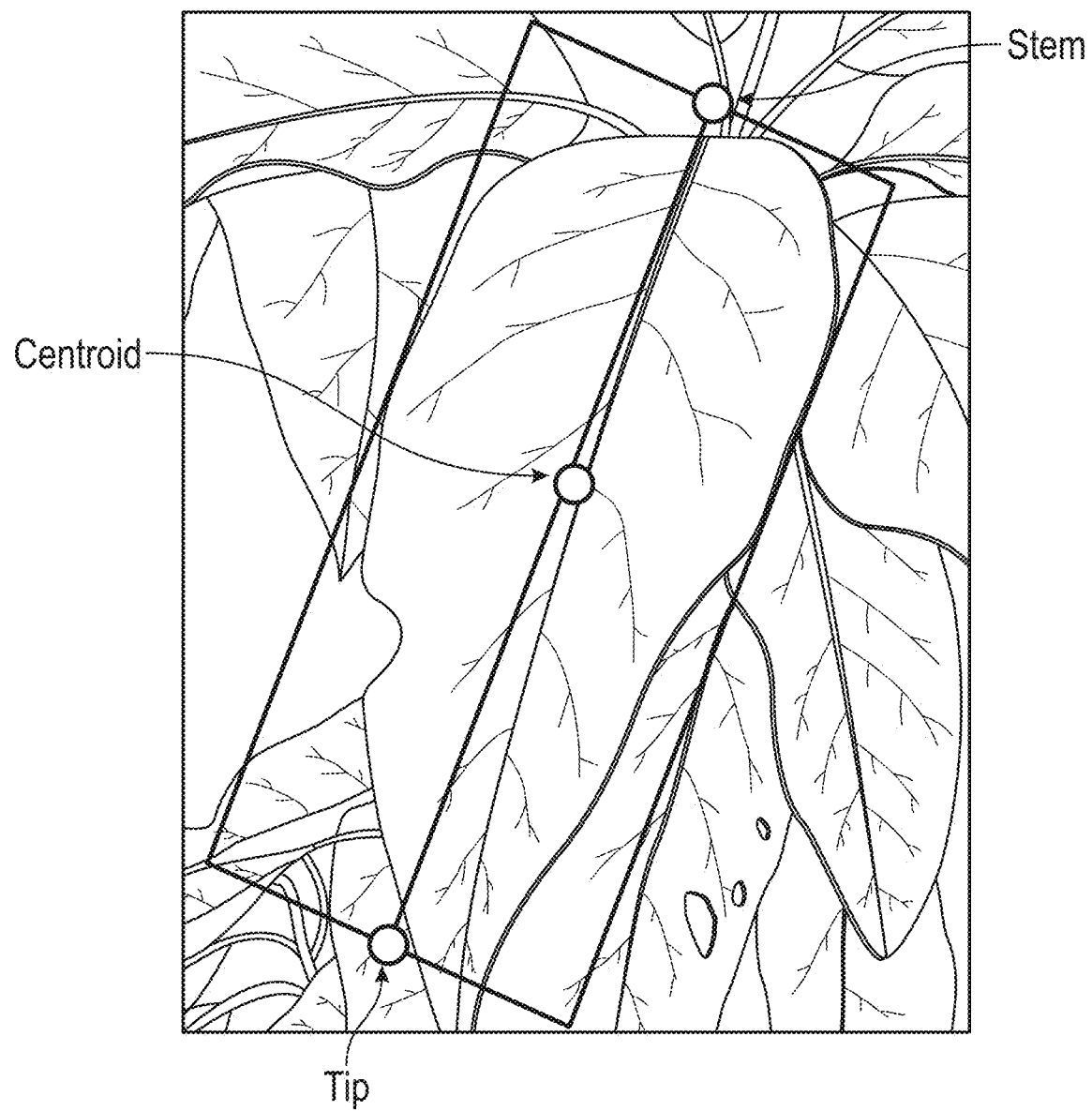
FIG. 4 depicts an example estimated keypoints of a leaf candidate and detected bounding box.

To localize the leaf, the estimated pixel coordinates from three parts of leaf candidates (stem, tip, and centroid keypoints) are provided for left and right images within the left camera frame, as shown in FIG. 4. The 3D position is estimated directly from the 3D point cloud provided by the ZED API. After the transformation from the pixel space to the spatial domain within the camera's reference frame, the leaf coordinates are transformed into the world coordinate frame. This reference frame transformation uses the known 6D-pose of the camera 220 on the robot's end-effector 200 to determine the position of the leaf within the world frame for retrieval.

End-Effector Design for Leaf Cutting

Leaf water potential analysis requires the test leaf's stem to be cleanly cut; a damaged specimen would negatively impact the analysis. Organic matter such as leaf stems exhibit visco-elastic properties. Based on visco-elastic material principles, faster cuts will require less force and result in less deformation of the leaf stem. Literature indicates that the shear stress ($\tau$) for cutting organic plant matter ranges from 0.85 to 5.9 MPa. Given the radius of a leaf stem (r), the required cutting force can be calculated as $F=\pi r 2\tau$. The minimum cutting speed was determined empirically at 0.312 m/s.

An example non-pneumatic cutting mechanism developed herein utilizes two 4-bar linkages 230 to actuate a set of sliding gates 232, one of which contains a razor blade 240 to cleanly sever the stem without damaging the leaf (FIG. 5). The gates 232 also help retain the leaf within the end-effector's chamber 210 after removal from the tree. These 4-bar mechanisms 230 are connected via a gear train to achieve synchronized motion. A low-cost, high-torque R/C servo (FEETECH FT5335M) drives the gear train while being amenable to adequate position control. An Arduino Due microcontroller 250 controls the servo motor and receives serial commands from a ROS control node. A breakout board connected to the Arduino contains a "safe/armed" switch along with LED indicators to reduce the risk of accidental injury from the razor blade. In some aspects, the cutting mechanism involves a piston 236 linked to a pulley system with a slider 234 (FIGS. 5B and 5C). The slider 234 is equipped with a razor 240, while opposite the slider is a cavity to securely enclose the blade 240 when the cutter closes. After a completed cut, the slider 234 and piston 236 position are reset using a set of springs connected to the pulley that retract the slider 234 once the piston pressure is released. It also incorporates a pneumatic subsystem 300 with may include an air compressor 310, an air tank 320, and a solenoid 330, all mounted on the base 400 of the robot. There is a single tube guided from the pneumatic subsystem 300 along the robotic arm 600. These serve to enable suction within the chamber 210 to improve leaf alignment. There is also a pressure switch connected in series with the load line to ensure the pressure does not exceed a certain amount.

In some aspects, the developed, non-pneumatic end-effector 200 is able to cut leaf stems with a design target force of 20 N at 1.1 m/s. This rate provides sufficient margin over the empirically determined minimum cutting speed of 0.312 m/s to account for any losses and work with a wide variety of tree-crops leaves (e.g., avocado, citrus, and almond tree-crops). The end-effector's chamber 210, in some embodiments, has an opening of 110 mm by 45 mm and a depth of 185 mm to accommodate typical avocado leaves. The end-effector 200 may be constructed with miniature aluminum extrusions, lightweight 3D printed parts, and laser-cut acrylic panels. An example assembly weighs 1.091 kg, which is 42% of the robotic arm's 2.6 kg payload. The end-effector 200 is powered separately from the arm to enable stand-alone testing with a 7.4 V 2S LiPo battery.

The experiments begin by testing the perception and actuation modules separately. Then, findings are integrated to perform complete leaf cutting and extraction experimental tests.

Leaf Detection

Objective: Identify the key parameters for optimal leaf detection using visual perception methods.

Setup: The camera was placed at different distances in the range [0.254, 0.304] m from the tree to evaluate the detection algorithm. As the resolution and quality of both RGB and Depth images are depended upon, the ZED Mini parameters needed to be tuned before running the detection.

The ZED Mini offers two sensing modes for depth images. The STANDARD and FILL modes provide different redundancy of the depth map depending on the processing of visual occlusion and filtering, as shown on FIG. 6. The depth mode that adjusts the level of accuracy, range, and computational performance of the depth sensing module is tuned via the ULTRA, QUALITY, and PERFORMANCE modes.

Figure 6:
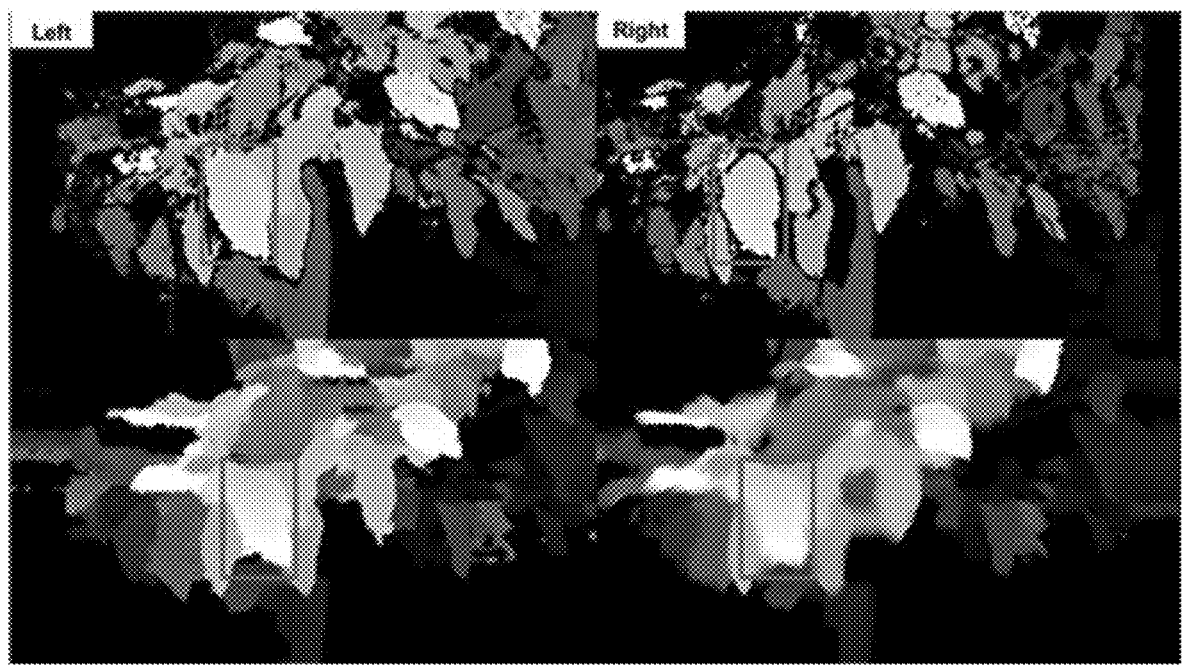
FIG. 6 depicts example depth images acquired from the ZED Mini stereo Camera showing the difference in detection for the same leaf in Left and Right Camera. Top: STANDARD mode, Bottom: FILL mode.
Figure 7:
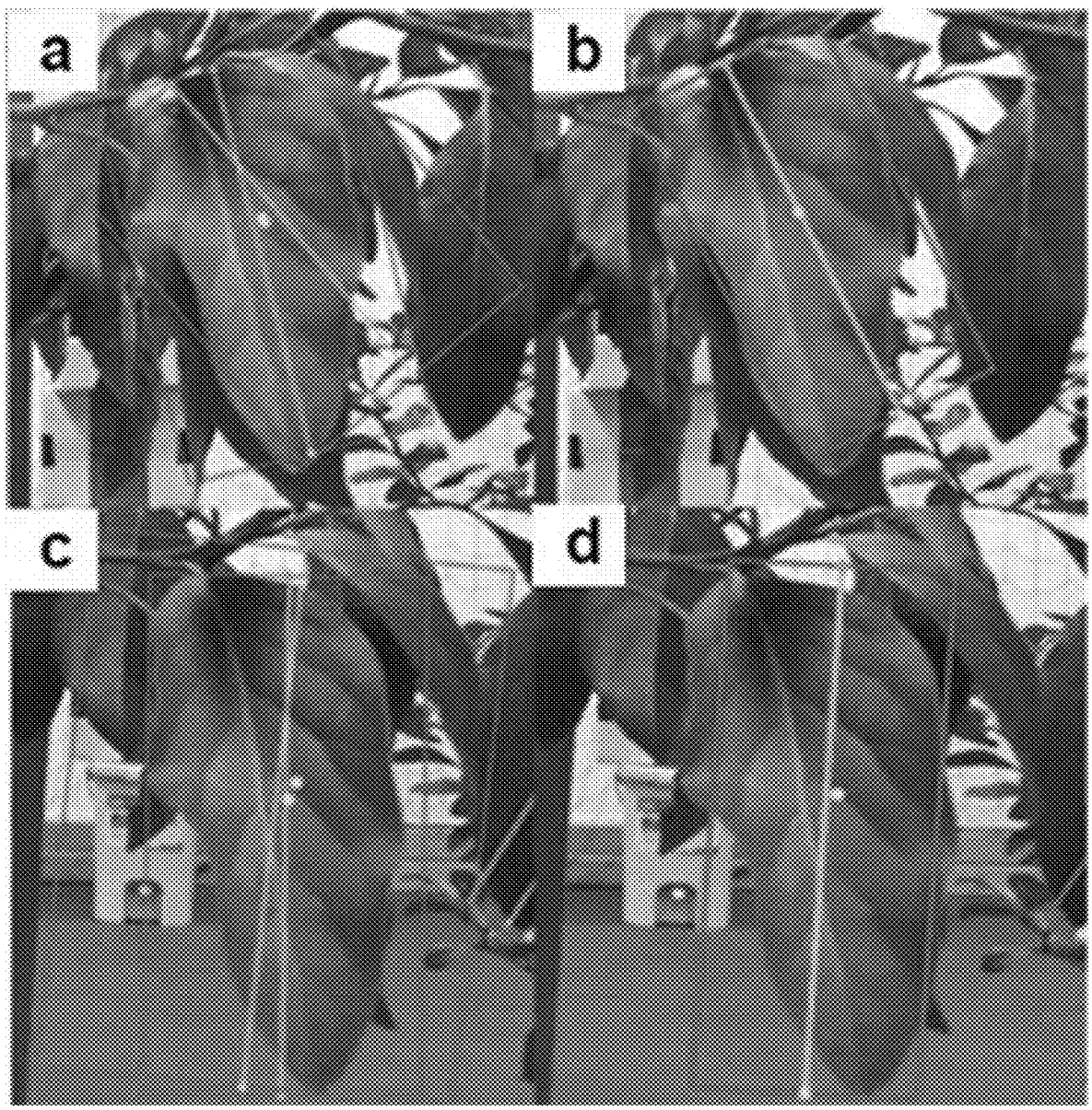
FIG. 7 depicts example bounding boxes. Panels (a) and (c): Examples of detecting bounding boxes twice. Panels (b) and (d): Respective outputs to remove excess bounding boxed following the merging process.

Next, the thresholds values for the segmentation and shape analysis are set with different viewpoint of the tree. Different conditions are evaluated to optimize the leaf shape detection. Results: The combination of the STANDARD and ULTRA modes is able to present the most relevant depth map for the application, as shown in FIG. 6, and provide more distinct areas of the leaf when combined with the QUALITY mode. The minimum and maximum depth range at 0.2 m and 2.0 m are set, respectively. Then, the detection algorithm is run (FIG. 3) on different images captured by the camera as the end-effector moves. In some trials, bounding boxes were detected twice, as depicted in FIG. 7. These overlapping boxes can be explained by the reflection of the light on the leaves leading to the detection of double edges by the Canny detector. To rectify this, a merging process checks the distances between the detected centroids, and based on the ratio between the related bounding boxes, selects and applies the most appropriate one.

Figure 8:
FIG. 8 depicts example key instances and operations from application of the proposed leaf detection algorithm. (a) Original RGB left image, (b) Threshold segmentation, (c) Depth segmentation, (d) Canny edge detection, (e) Contour detection, (f) Output bounding boxes and annotated keypoints.

FIG. 8 depicts an example of a sequence of outputs from the various key different stages of the proposed detection algorithm. The final output includes the annotated stem, tip and leaf centroid, which are then used for leaf localization.

Leaf Localization

Objective: Determine the position of the leaf within the world frame and identify which keypoint (stem, tip, centroid) provides consistent spatial coordinates.

Setup: The 3D position coordinates of tree leaves' stems, tips and centroids, as well as other keypoints around the tree from the 3D point cloud provided by the ZED API are extracted. To validate the accuracy of the provided distances, measured manually the ground truth between the considered points and left camera position is also measured. In total 15 target points are considered, of which 20% are in the background (around the tree) and the remaining 80% are located on the tree.

Results: consistent spatial coordinates for about 67% (10 out of 15) of the target points with an average error of 22.77 mm (Table I) are obtained. Three out of the five invalid (NaN) values were located on the tree. Of the points along the midrib (e.g., the leaf's center vein), the stem and the tip of the leaf are located on the edges of the point cloud, which can yield unstable points and return invalid detection. Thus, detected leaf centroids along the midrib are more robust keypoints and were selected as the input to the path planner.

Leaf Cutting

Objective: Determine the minimum speed necessary to cleanly cut the leaf stem.

Figure 9:
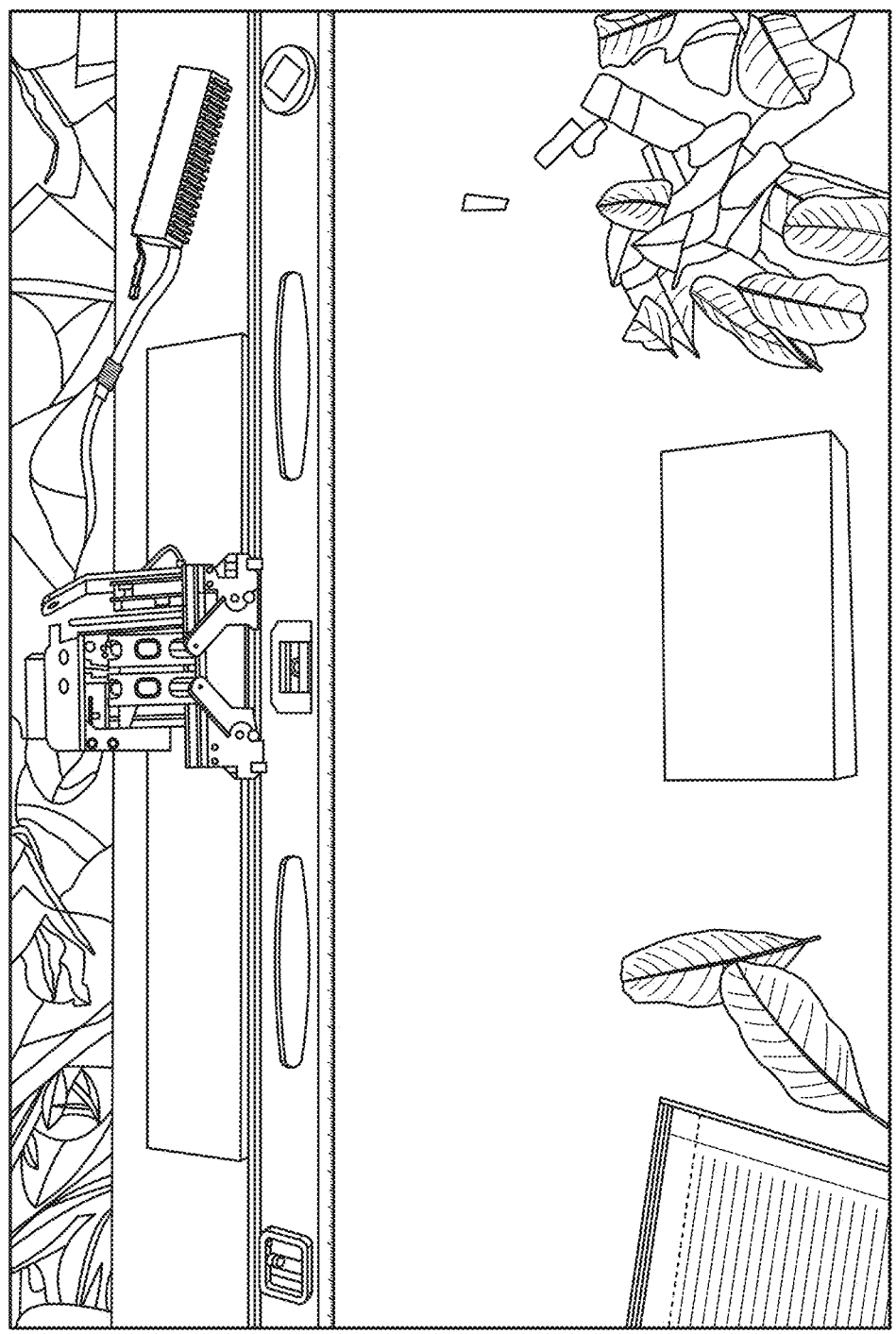
FIG. 9 depicts an example experimental setup for the leaf cutting tests. A first prototype end-effector mechanism was placed above a level. A high-speedf5 camera was used to record the cutting operation.

Setup: An initial prototype leaf cutter was placed on a level platform above a measuring stick with a high-speed camera positioned to face the cutting blades (FIG. 9). Three gear sets were 3D-printed so that they could be inserted between the servo motor and the cutting mechanism to adjust the speed. For each gear ratio (7:13, 22:13, 41:13), four leaves were inserted into the mechanism and the high-speed camera recorded the cutting attempt for each leaf.

TABLE I

Leaf Detection Accuracy Tests

| Target Point | Estimated Distance (mm) | Ground Truth (mm) |
|---|---|---|
| 1 | NaN | 3690 |
| 2 | NaN | 1530 |
| 3 | 1702 | 1680 |
| 4 | 627.5 | 710 |
| 5 | 591.6 | 580 |
| 6 | 591.6 | 570 |
| 7 | NaN | 580 |
| 8 | 657.3 | 700 |
| 9 | 593.2 | 580 |
| 10 | NaN | 750 |
| 11 | 567.4 | 560 |
| 12 | NaN | 600 |
| 13 | 779.6 | 770 |
| 14 | 616.4 | 610 |
| 15 | 669.3 | 710 |

The selected motor had sufficient torque margins so that the desired cutting force could be delivered with all tested gearing setups. Recorded frames were analyzed to determine the terminal speed of the cutting mechanism. Since the camera frame rate (240 fps) and the travel distance (19.1 mm) are known, the terminal cutter speed can be calculated as $$V = \frac{\delta x}{\delta t} \approx \frac{\Delta x}{\text{frame rate} \times \text{frame count}} \quad (1)$$

Figure 10:
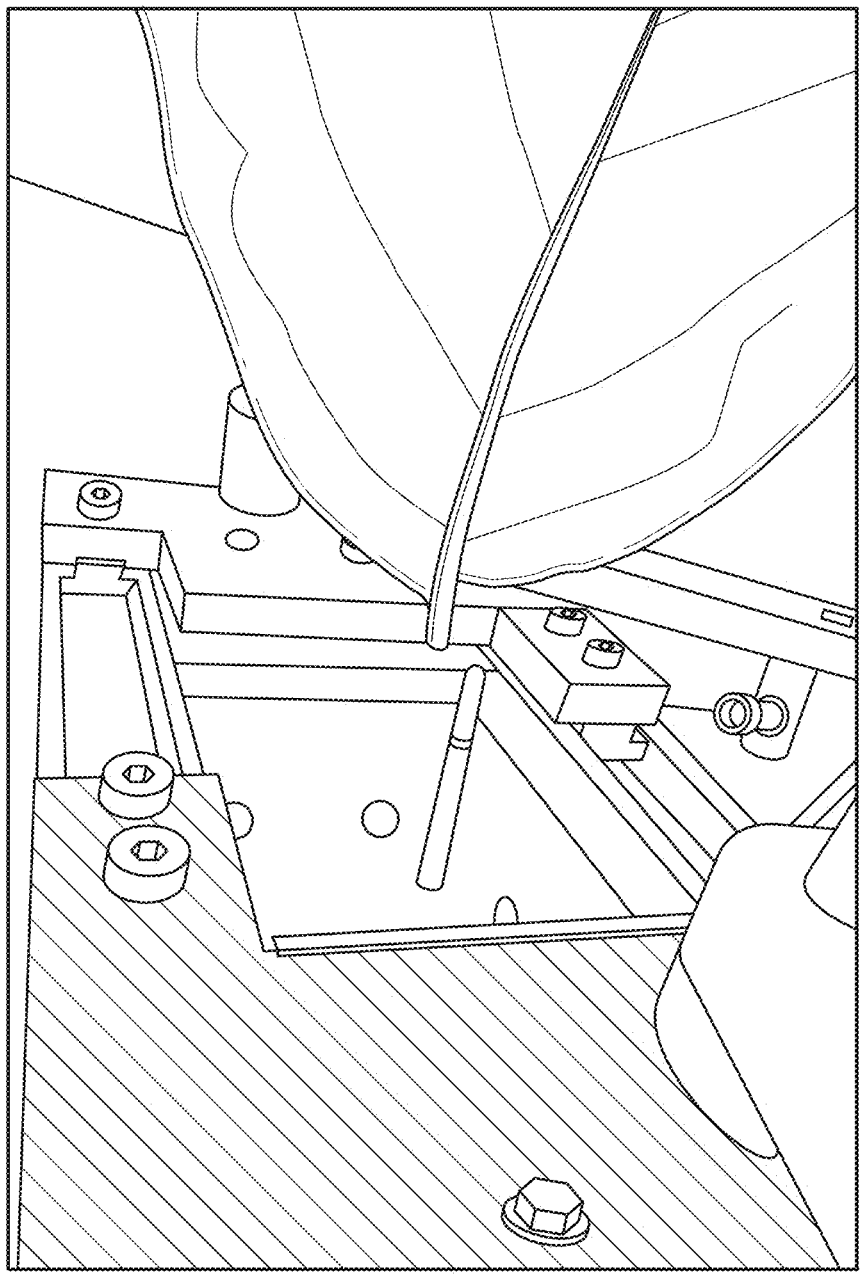
FIG. 10 depicts an example of a prototype, non-pneumatic end-effector cleanly cutting leaf stems as desired. Seen here is the cut stem of a Mexicola Avocado tree leaf.

Results: Table I shows the estimated distance and ground truth of all the target points. Of the three gear ratios, only the fastest gearing resulted in a cleanly cut leaf. Table II shows results from all trials, while FIG. 10 shows the cut stem from a Mexicola Avocado tree. From this analysis, the minimum cutting speed for the cutter for this embodiment should be 0.312 m/s. This result was used in iterative design of a non-pneumatic end-effector prototype to optimize the gearing of the 4-bar mechanism and the gearing on the servo motor.

TABLE II

Leaf Cutting Speed Tests

| Gear Ratio | Frame Count | Time (s) | Speed (m/s) | Success |
|---|---|---|---|---|
| 7:13 | 48 | 0.200 | 0.095 | No |
| 7:13 | 40 | 0.167 | 0.114 | No |
| 7:13 | 39 | 0.163 | 0.117 | No |
| 7:13 | 41 | 0.171 | 0.112 | No |
| 22:13 | 20 | 0.083 | 0.229 | No |
| 22:13 | 25 | 0.104 | 0.183 | No |
| 22:13 | 17 | 0.071 | 0.269 | No |
| 22:13 | 18 | 0.075 | 0.254 | No |
| 41:13 | 16 | 0.067 | 0.286 | Yes |
| 41:13 | 20 | 0.083 | 0.229 | Yes |
| 41:13 | 11 | 0.046 | 0.416 | Yes |
| 41:13 | 14 | 0.058 | 0.327 | Yes |

Leaf Extraction

Objective: Determine an effective path planning routine to extract a leaf and verify the system's end-to-end capability to localize, cut, and extract a leaf from a live tree.

Setup: At this stage of development, testing of a full, non-pneumatic system stack took place inside the lab. The robotic arm was positioned next to an avocado tree such that the distance between the base link of the robotic arm and the end-effector was 1.05 m. This placement allowed the camera on the end-effector to begin searching for a candidate leaf at an offset distance of 0.34 m from the canopy. From the robot's home position, the arm would then begin the 9-point search grid to identify a target leaf, proceed to it, and cut it following the procedure shown in FIG. 2.

Figure 11:
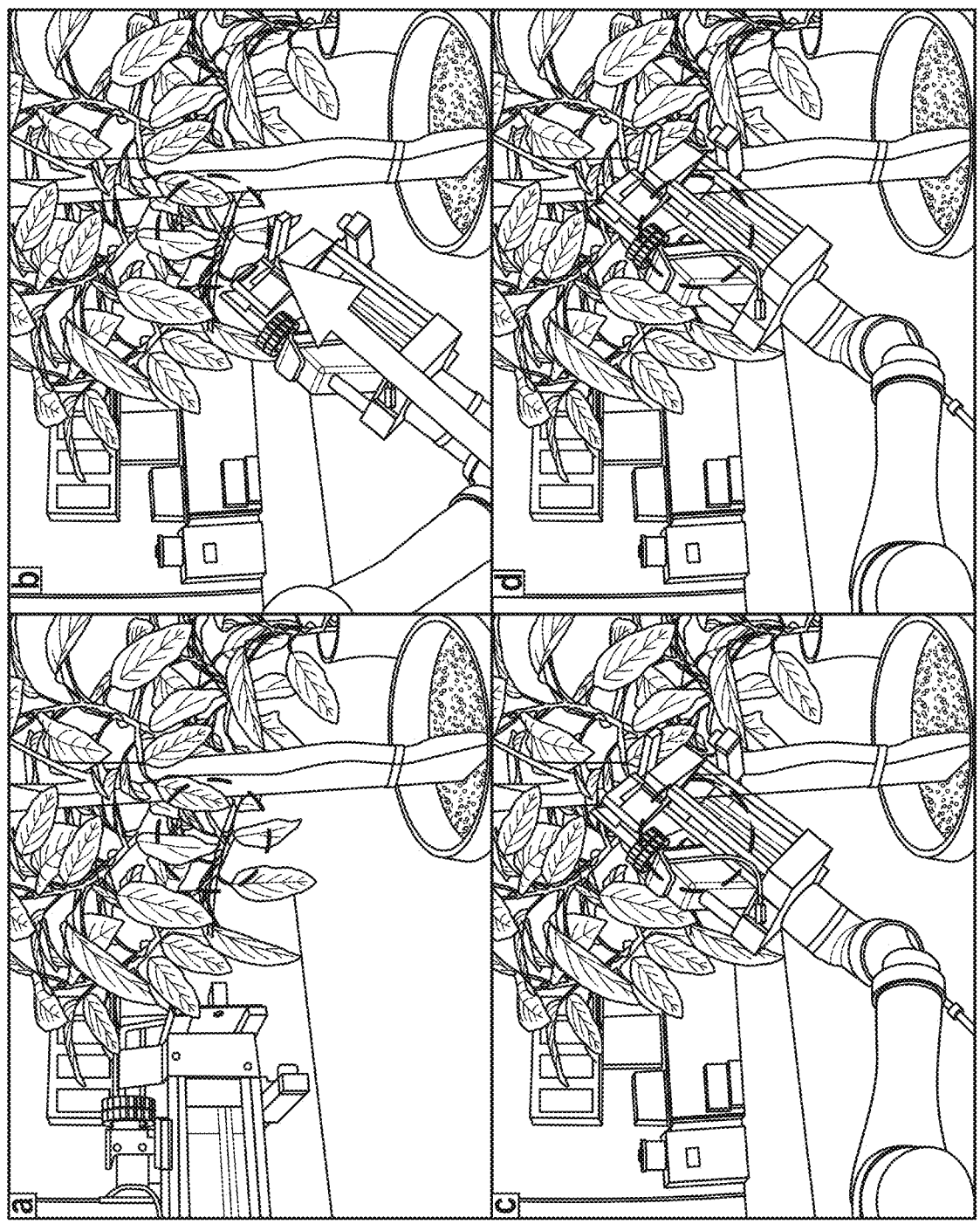
FIG. 11 depicts example snapshots from testing a prototype overall leaf extraction pipeline proposed in this work.

Results: Results demonstrate that the robot can successfully detect, approach, clean cut and extract a leaf from a live plant, following the overall routine outlined in herein. FIG. 11 demonstrates snapshots of a successful trial, and the supplementary video contains a complete trial. These results offer preliminary feasibility that clean stem cut leaf extraction is possible, and sets the basis for further improvement in future work. Overall, eight trials are performed. Out of these one was successful (e.g., 12.5% success rate), with an average time to complete the cut or abort if not successful of 2.59 min (the successful cut lasted 3.18 min).

This work demonstrated the feasibility of robotic leaf cutting and retaining for future use in robotic leaf water potential measurements and analysis. Both the developed robotic end-effector for leaf cutting and classical computer vision method for leaf detection and localization provided distinct advantages for the developed system. The end-effector provided the system with a unique methodology for clean cutting leaves at their stem while still preserving the integrity of the leaf for the next steps of a leaf water potential measurement system. Similarly, the implemented visual perception pipeline can offer a robust and computationally-efficient method to detect and localize target leaves.

In spite of the overall success of the system to extract leaf samples, further room remains for improvement and optimization. One critical aspect addressed in future work is the identification of the 6D-pose of the leaf, which can improve the accuracy of the offset pose and remove the necessity of assuming a fixed angle of attack to approach the leaf. An issue arising from the fixed angle of attack assumption is that leaves may be pushed by the chamber's bottom side and curl. Leaf curling can lead to misalignment between the leaf's center vein ("midrib") and the end-effector's direction of motion, which in turn may lead to sub-optimal stem cut or even pushing the leaf away from the cutting chamber and lead to aborting the task. Adoption of the pneumatic system improves the leaf alignment.

Example 2

Picking a leaf generally has two key components: actuation and perception. For actuation, a custom-built leaf-cutting end-effector is designed and retrofitted on a mobile manipulation base platform (Kinova Gen-2 six degree of freedom (6-DOF) robot arm mounted on a Clearpath Robotics Husky wheeled robot). For perception, cloud data from a depth camera (Intel RealSense D435i) are utilized for the leaf detection and localization algorithm developed herein. The point cloud data is processed using Open3D running on an Intel i7-10710U CPU (or, in some aspects, an Intel Core it-8700 on the pneumatic version), without any additional GPU acceleration. FIG. 13 highlights how the disclosed device interacts in a leaf-cutting system, which is further evaluated below.

Identified and segmented leaves serve as target for the arm to move and align the end-effector along a viable leaf, at an offset position from the center of the leaf. The offset distance is equivalent to the length of the leaf. Once at the offset position, the arm moves linearly toward the leaf to capture it. When the leaf is enclosed, the end-effector cuts the leaf. Then, the arm returns home.

Actuation

In some aspects, a non-pneumatic stem-cutting end-effector developed herein utilizes two 4-bar linkages to actuate a set of sliding gates, one of which contains a razor blade to remove the leaf from the tree (FIG. 14). The gates also help retain the leaf within the end-effector's chamber after removal from the tree. These 4-bar mechanisms are connected via a gear train to achieve synchronized motion. A low-cost, high-torque R/C servo (FEETECH FT5335M) drives the gear train, while being amenable to position control. An Arduino Due microcontroller controls the servo motor and receives serial commands from a ROS control node. A breakout board connected to the Arduino contains a "safe/armed" switch, along with LED indicators, to reduce the risk of accidental injury.

Stem water potential analysis requires the test leaf's stem to be cleanly cut; a damaged specimen would negatively impact the analysis. Organic matter such as leaf stems exhibit visco-elastic properties. Based on visco-elastic material principles, faster cuts will require less force and result in less deformation of the leaf stem. In some aspects, the non-pneumatic end-effector is able to cut leaf stems with a design target force of 20 N at 1.1 m/s. The end-effector's chamber in some embodiments has an opening of 110 mm by 45 mm and a depth of 185 mm to accommodate typical avocado leaves. The end-effector may be constructed with miniature aluminum extrusions, lightweight 3D printed parts, and laser-cut acrylic panels. An example assembly weighs 1.091 kg, which is 42% of the robotic arm's 2.6 kg payload. The end-effector is powered separately from the arm to enable stand-alone testing with a 7.4 V 2S LiPo battery.

To determine the types of leaves that can be cut by the mechanism, testing with a variety of trees in a local orchard is performed. In some aspects, the non-pneumatic end-effector was manually placed around leaves and activated. Four different crops were selected (avocado, clementine, grapefruit, and lemon) for evaluation. For each crop, ten cutting attempts were performed. Results are shown in Table III. The end-effector was able to cut 95% of the leaves (38 out of 40). Lower success rates were observed for the lemon and grapefruit leaves. This is due to these particular leaves having shorter stems, which made it harder to position the end-effector around the stem without interference from branches or other leaves. The end-effector worked consistently on clementine and avocado leaves.

TABLE III

Leaf Cutting Tests

| Crop | Successful Cuts | Attempts | Rate |
|---|---|---|---|
| Avocado | 10 | 10 | 100% |
| Clementine | 10 | 10 | 100% |
| Grapefruit | 9 | 10 | 90% |
| Lemon | 9 | 10 | 90% |
| Total | 38 | 40 | 95% |

Perception

A leaf detection and localization algorithm using 3D point cloud and processed through the Open3D library is proposed. The non-pneumatic approach is outlined in FIG. 13A, and the pneumatic approach is outlined in FIG. 13B. The detection phase seeks to obtain the 3D bounding box of leaves candidates from point cloud captured from the depth camera. First, outliers considered as noise resulting from sensor measurement inaccuracies are removed, and the background at a specific distance threshold from the camera frame is segmented out. Then, downsampling is applied to optimize the performance of the upcoming step. Next, the remaining point cloud segments are grouped into clusters using the Density Based Spatial Clustering of Applications with Noise (DBSCAN) approach. It relies on two parameters, the minimum distance between two points to be considered as neighbors (eps) and the number of minimum points to form a cluster (MinPoints).

Each resulting cluster is considered a potential leaf and described by a 3D bounding box defined by center $C=[c_x, c_y, c_z]^T$, dimensions $D=[h, w, d]$, and orientation $R(\theta, \Phi, \alpha)$. Then, filtering is applied on the clusters using geometric features of the bounding box: number of points, volume, leaf ratio. Finally, the pose of the center of each bounding box is returned as the 6D pose of a potential leaf. To validate the approach, offline tests for detection and localization are conducted separately. For the detection step, ROSbags were collected both in indoor and outdoor settings. Indoors (lab with constant light conditions), the Kinova arm with the camera placed at different distances (e.g., 0.2-0.3 m) from a potted tree is used. Outdoors (local orchard with varying light conditions), data are collected manually. A wide range (e.g., 0.5-1.6 m) of distances from trees is considered; an example is shown in FIG. 15A. A total of 25 point clouds were collected (10 indoor and 15 outdoor), and tested offline with different combinations for eps and MinPoints parameters, to determine optimal values for later use.

Table IV shows the outcome of the experiments on the 10 indoor point clouds and 15 outdoor point clouds using an example non-pneumatic end-effector. An average of 80.0% of detection with a maximum of 90% for indoor dataset, and an average of 79.8% with a maximum 85% for outdoor are attained. Further, the distance between the camera and the tree may impact the optimal values for the point cloud processing. The greater the distance from the camera, the higher eps while MinPoints decreases.

TABLE IV

Leaf Point Cloud Detection

| | Point Clouds | Total # Leaves | Average Detection | Percentage |
|---|---|---|---|---|
| Indoor | 10 | 20 | 16 | 80.0% |
| Outdoor | 15 | 99 | 79 | 79.8% |

To validate the localization phase, several 6D poses obtained via the proposed approach are compared against ground truth data obtained from a VICON motion capture camera system. Retroreflective markers were places around the center of leaves, as shown in FIG. 16, to estimate their pose.

Table V summarizes the results obtained for 12 random leaves positions. The approach provides an estimation with mean error of 8.28 mm, 14.38 mm, and 15.54 mm along x-axis, y-axis, and z-axis, respectively, for a range of avocado leaves (e.g., widths between 24-86 mm and lengths between 54-150 mm). Based on the average leaf size (48×91 mm), estimation errors represent nearly 15% of the width and 17% of the length. The orientation is evaluated by calculating the Euclidean distance between the two provided values. A mean error of 5.3° is obtained. The obtained 6D pose may drift from the physical center of the leaf, e.g., on the y-axis and z-axis, due to human-induced error and the non-rigid nature of the leaf, which impacts marker placement.

TABLE V

Leaf 6D Pose Error

| Error | Δx (mm) | Δy (mm) | Δz (mm) | Orientation (deg) |
|---|---|---|---|---|
| Mean | 8.28 | 14.38 | 15.54 | 5.3 |
| Std dev | 7.46 | 5.46 | 6.69 | 15.5 |

The proposed approach provides an initial 6D pose along useful information of potential leaves using a processed 3D point cloud and obtained up to 80% of detection and a mean error less than 16 mm and 5.3°. Both detection and localization steps were performed without the need of collection or storage of large data including 3D models, and training process. Furthermore, all tests were run using a CPU configuration, without any additional GPU acceleration.

To evaluate the overall leaf detection, localization, and cutting pipeline, a real potted avocado tree indoors (lab) is tested. The mobile manipulator and non-pneumatic end-effector system was positioned at random poses near the base of the tree so that the end-effector was at a range of distances (e.g., 0.2-0.3 m) from the edge of the tree canopy. An experimental trial consisted of collecting a point cloud, storing the identified and localized potential leaves in a queue, and then sending the queued leaves to the arm for a retrieval attempt. Each trial concluded once the queue was depleted and the tree was repositioned for the next trial. FIG. 17 outlines this process.

For each retrieval attempt, leaf candidates and viable leaves are determined. Leaf candidates are leaves that have a pose within the arm's workspace. Viable leaves are leaf candidates that have a retrieval path within the arm's workspace. For testing the point cloud detection, both successful captures and successful cuts of the leaf are monitored. A successful capture occurs when the end-effector is placed around a viable leaf, while a successful cut occurs when the enclosed leaf is removed from the tree. A clean cut occurs when the leaf is severed cleanly at the stem such that it could be used for stem water potential analysis.

Out of 46 trials, 63 potential leaves were detected by the point cloud. (Note that each point cloud in the trial could produce a variable amount of leaves, hence a higher number of potential leaves than trials.) After filtering the potential leaves to remove the leaves outside of the work space, 39 viable leaves remained. Out of these leaves, 27 were captured successfully (69.2%) while 21 of the 27 captured leaves were cut (77.8%). Table VI summarizes retrieval results, while Table V highlights the process times. The mean point cloud processing (perception) time was 5.6 sec and the mean cutting (actuation) time was 10.6 sec. The mean total retrieval time was 16.2 sec.

TABLE VI

Leaf Retrieval Numbers & Rates

| Stage | Number | Rate |
| --- | --- | --- |
| Potential Leaves | 63 | N/A |
| Candidate Leaves | 51 | 81.0% |
| Viable Leaves | 39 | 76.5% |
| Successful Captures | 27 | 69.2% |
| Successful Cuts | 21 | 77.8% |
| Clean Cuts | 4 | 19.0% |
| Near Misses | 7 | 30.0% |

The system was able to remove a total of 21 leaves from the tree. However, not all leaves were clean cuts on the stem; four were classified as clean cuts for use in stem water potential analysis. The majority of the leaves were severed at the top of the leaf and not at the stem (FIG. 18). The system produced seven near-misses where the stem was leaf was cut within an average of 9.58 mm from the stem (std dev: 6.1 mm). The remaining 10 leaves were severed closer to the middle of the leaf, largely due to collisions with the branches. Similar branch interference also lead to four out of the six missed cuts from the captured leaf. These two problems could be solved in future work through a refined end-effector design, more robust path planning to account for branches, and implementing visual servoing for continuous stem alignment as the end-effector approaches a viable leaf.

TABLE VII

Leaf Retrieval Performance Time (Seconds)

| Metric | Perception Part | Actuation Part | Overall Retrieval |
| --- | --- | --- | --- |
| Min | 0.5 | 4.6 | 6.1 |
| Max | 11.0 | 61.7 | 62.5 |
| Mean | 5.6 | 10.6 | 16.2 |
| Median | 7.7 | 8.1 | 15.3 |
| Std dev | 3.9 | 10.4 | 10.2 |

Disclosed herein is a co-designed actuation and perception method for leaf identification, 6D pose estimation, and cutting. The developed prototype leaf-cutting end-effector can cut leaves of various types of trees (avocado, clementine, grapefruit, and lemon) cleanly at their stem with a 95% success rate on average. The proposed 3D point cloud technique can be successful for detecting an average of 80.0% of leaves indoors and 79.8% outdoors, and localizing them with less than 17% error along the leaf's length or width. Experimental testing of the overall proposed framework for leaf cutting reveals that the system can capture 69.2% of viable leaves and cut 77.8% of those captured leaves.

These results offer a promising initial step toward automated stem water potential analysis, nonetheless several steps remain and are exciting avenues for future work. The non-pneumatic end-effector can effectively cut the leaves, but its size presents a challenge when cutting certain leaves like those from lemon and grapefruit trees, which in turn calls for further design optimization. The current path planning approach works well for leaves that are on the periphery of the tree's canopy. Alternate path planning strategies can be explored to reach leaves within the canopy closer to the trunk and integrated with visual servoing to better align the cutter with the stem of the leaf as it is about to cut it. To enable automated stem water potential analysis, the captured leaf will need to be transferred from the end-effector into a pressure chamber.

Example 3

The end-effector design is constrained by three key requirements that must be addressed for the leaf water potential analysis. First, the end-effector needs to cleanly cut the leaf stem to separate the test specimen from the host tree. Second, the end-effector needs to capture and retain the cut leaf for analysis. Finally, the end-effector needs to maintain a target weight of less than 50% of a typical robotic arm's payload of 2.6 kg to ensure mobility throughout the arm's workspace.

Cleanly Cutting the Stem

Leaf water potential analysis requires the test leaf's stem to be cleanly cut; a damaged specimen would negatively impact the analysis. Given the radius of a leaf stem (r), the required cutting force can be calculated as $F = \pi r 2 \tau$. The diameter of 10 leaves from four different tree crops (avocado, clementine, grapefruit, and lemon) for a total of 40 leaves are measured. The average leaf stem diameter was 2.09 mm with a standard deviation of 0.51 mm. Literature indicates that the shear stress (T) for cutting organic plant matter ranges from 0.85 to 5.9 MPa. With this information, the estimated force required to cut the average leaf ranges from 2.9 to 20 N.

However, organic matter such as leaf stems exhibit viscoelastic properties. When stress is applied to a viscous material, the material resists the deformation linearly with time. When stress is removed from an elastic material, the material returns to the original non-deformed state. Based on viscoelastic material principles, faster cuts will require less force and result in less deformation of the leaf stem. Hence, the rate of cut is equally important to the delivered force. For this reason, a set of cutting experiments to determine the optimal cutting rate are conducted. The minimum cutting speed for the prototype was determined empirically at 0.312 m/s. With both the cutting force and rate determined, an end-effector with a desired target force of 20 N at 1.1 m/s is developed. This rate provides sufficient margin over the empirically determined minimum cutting speed of 0.312 m/s to account for any losses and work with a wide variety of tree leaves (e.g., avocado, clementine, grapefruit, and lemon).

Camera Selection & Placement Evaluation

Several cameras were considered as the sensing modality for the proposed end-effector (Table VIII). Although the ZED and ZED2 have solid performance, they were excluded because of their wide baselines which do not fit the intended eye-on-hand configuration. The performance of the three other cameras in different conditions including indoor and outdoor environments are evaluated. The obtained results show that the Realsense (RS) D435i has the best performance, especially outdoors where it is able to provide a viable depth image at close ranges. Furthermore, high-quality point clouds at a lower depth range than the manufacturer specifications (0.1 m) are obtained. Sample images collected using the RS D435i are shown in FIG. 20.

TABLE VIII

Candidate Cameras Specifications

| Camera | Baseline [mm] | Depth Range [m] | Field of View |
|---|---|---|---|
| ZED | 120 | 0.3-25 | 90° × 60° × 100° |
| ZED2 | 120 | 0.3-20 | 110° × 70° × 120 |
| ZED mini | 63 | 0.1-15 | 90° × 60 × 100° |
| RS D435i | 50 | 0.2-3 | 87° × 58° × 95° |
| RS D455 | 95 | 0.4-6 | 87° × 58° × 95° |

Two eye-on-hand configurations were considered (FIG. 21). While the configuration in panel (a) can lead to longer look-ahead distances the configuration in panel (b)—angled downward at 45°—was ultimately selected. This configuration strikes a balance between providing useful depth information about the tree (which is helps with obstacle avoidance and navigation around tree branches) and allowing for leaf detection and tracking (which may help with aligning the end-effector with the leaf to cut it).

Integrated End-Effector Design

After evaluating the actuation and perception sub-systems, an integrated non-pneumatic prototype was constructed. The cutting mechanism utilizes two four-bar linkages to actuate a set of sliding gates, one of which contains a razor blade to cleanly sever the stem without damaging the leaf (FIG. 22). The gates also help retain the leaf within the end-effector's chamber after removal from the tree. These four-bar mechanisms are connected via a geartrain to achieve synchronized motion. A low-cost, high-torque R/C servo (FEETECH FT5335M) drives the geartrain while being amenable to adequate position control. In one embodiment, the end-effector's chamber has an opening of 110 mm×45 mm and a depth of 185 mm to accommodate typical avocado leaves (which are the largest of the four tree crops considered in this work). The end-effector may be constructed with miniature aluminum extrusions, lightweight 3D printed parts, and laser-cut acrylic panels. An example non-pneumatic assembly weighs a total of 1.09 kg, which is 42% of the robotic arm's 2.6 kg payload.

The end-effector operates symbiotically with the Robot Operating System (ROS). High-level control commands are handled via a ROS node. The node receives commands from published ROS topics and issues commands to the end-effector via Serial UART communication. The non-pneumatic end-effector contains an embedded microcontroller (Arduino Due) to parse the received serial commands and control the motor that drives the cutting mechanism. A breakout board connected to the Arduino contains a "safe/armed" switch along with LED indicators to reduce the risk of accidental injury from the razor blade. (For redundancy, the high-level ROS control node also has a software "safe/armed" switch.) A 7.4 V 2S LiPo battery powers the end-effector mechanism.

Pressure Chamber Setup for SWP Analysis

For SWP analysis, the manual pump-up chamber from PMS Instrument (FIG. 23) is used. The chamber has a removable lid with a rotary compression gland, which the user needs to insert the excised stem through and secure Similar to a bicycle pump, a manual compression stroke creates pressure in the chamber, achieving about 0.5 Bar pressure per stroke. In its original configuration, the pump-up chamber features a 7× magnifying lens for the user to look through down at the xylem to determine the onset of water expression. An attached 20 Bar gauge indicates the chamber's internal pressure. At full water expression, the user notes down the pressure.

To help expedite this laborious process, and with an eye to further automating the process in the future, the original magnifying lens is replaced with a wireless camera and custom adjustable mount assembly that can provide macro images and video feed of the xylem in real-time. The camera mount assembly is 3D-printed using carbon-fiber-reinforced material for increased stability. The mount assembly uses two links to grip onto the removable chamber lid, and two platforms screwed onto the links to provide lateral stability and a transitional fit interface to securely mount the camera. Thanks to the intended small clearances in the design, the mount is very stable and does not exhibit any oscillatory motion despite the manual pumping operation. The video data proves the validity of this setup since vibrational noise is minimal in the videos, and the xylems are shown clearly in each frame, as discussed below. Further, to minimize chances of overexposing the video feed in outdoor environments where lighting can vary drastically by location, a short opaque cover extended over and around the lens is appended in lieu of aperture control.

Cutting Speed Tests

Objective: Determine the minimum speed necessary to cleanly cut the leaf stem.

Setup: An initial, non-pneumatic prototype leaf cutter was placed on a level platform above a measuring stick with a high-speed camera positioned to face the cutting blades (FIG. 24). Three distinct gear sets were 3D-printed so that they could be inserted between the servo motor and the cutting mechanism to adjust the speed. For each gear ratio (7:13, 22:13, 41:13), four leaves were inserted into the mechanism and the high-speed camera recorded the cutting attempt for each leaf.

The selected motor had sufficient torque margins so that the desired cutting force could be delivered with all tested gearing setups. Recorded frames were analyzed to determine the terminal speed of the cutting mechanism. Since the camera frame rate (240 fps) and the travel distance (19.1 mm) are known, the terminal cutter speed can be calculated as $$V = \frac{\delta x}{\delta t} \approx \frac{\Delta x}{\text{frame rate} \times \text{frame count}} \qquad (2)$$

Results: Of the three gear ratios, only the fastest gearing resulted in a cleanly cut leaf. Table II shows results from all trials, and FIG. 25 depicts sample frames of the process. From this analysis, the minimum cutting speed for the cutter should be 0.312 m/s. This result was used in iterative design of the non-pneumatic end-effector prototype to optimize the gearing of the four-bar mechanism and the gearing on the servo motor. A later design had a fixed gear ratio that works on the four leaves identified in the preliminary analysis (avocado, clementine, grapefruit, and lemon).

Field Non-Pneumatic Leaf Cutting Tests

Objective: Determine the cutting performance of an example non-pneumatic end-effector.

Setup: To determine the types of leaves that can be cut by the mechanism, a variety of trees in a local orchard is tested. An example non-pneumatic, prototype end-effector was manually placed around leaves and activated. Four different crops were selected (avocado, clementine, grapefruit, and lemon) for evaluation. For each crop, twenty cutting attempts were performed.

TABLE IX

Leaf Cutting Velocity Tests

| Gear Ratio | Frame Count | Time (s) | Speed (m/s) | Success |
|---|---|---|---|---|
| 7:13 | 48 | 0.200 | 0.095 | No |
| 7:13 | 40 | 0.167 | 0.114 | No |
| 7:13 | 39 | 0.163 | 0.117 | No |
| 7:13 | 41 | 0.171 | 0.112 | No |
| 22:13 | 20 | 0.083 | 0.229 | No |
| 22:13 | 25 | 0.104 | 0.183 | No |
| 22:13 | 17 | 0.071 | 0.269 | No |
| 22:13 | 18 | 0.075 | 0.254 | No |
| 41:13 | 16 | 0.067 | 0.286 | Yes |
| 41:13 | 20 | 0.083 | 0.229 | Yes |
| 41:13 | 11 | 0.046 | 0.416 | Yes |
| 41:13 | 14 | 0.058 | 0.327 | Yes |

Results: For each attempt, a successful cut occurs when the enclosed leaf is removed from the tree. A clean cut occurs when the leaf is severed cleanly at the stem such that it can be used for stem water potential analysis. The non-pneumatic end-effector was able to successfully cut 93.75% of the leaves (75 out of 80) with 61.25% being clean cuts. Results are shown in Table X. Lower success rates were observed for the lemon and grapefruit leaves. This is because these particular crops have very short stems that makes it harder to position the end-effector around the stem without interference from branches or other leaves. The end-effector worked consistently on clementine and avocado leaves. An instance of one trial and retrieved leaf in the enclosure of the end-effector are shown in FIG. 26.

TABLE X

End-effector Field Tests

| Crop | Clean cut | Near missed cut | Missed cut |
|---|---|---|---|
| Avocado | 15 | 5 | 0 |
| Clementine | 15 | 5 | 0 |
| Grapefruit | 11 | 8 | 1 |
| Lemon | 8 | 8 | 4 |
| Rate | 61.25% | 32.50% | 6.25% |

Stem Water Potential Analysis Comparison

Objective: Compare the performance of the end-effector-cut leaves with the manually cut leaves in stem water potential analysis.

Setup: Obtaining closeup images of the xylems required a camera setup capable of macrophotography since the scale of the xylems was approximately only 2 mm in diameter. The images were obtained through the wireless camera mounted on top of the pressure chamber (FIG. 23). To retain a close match with the actual practice, all tested leaves were bagged with a water potential reflective foil bag for at least ten minutes before cutting them. This helps mitigate transpiration, thus increasing the accuracy of SWP measurements.

Results: A total of ten leaves were cut and had their SWP measured. Five leaves were cut by each method, and the SWP average measurements and standard deviation are tabulated in Table XI. These measurements were taken at a range of pressures for the manually cut leaves (e.g., 10.4 to 12.6 Bar) and the end-effector-cut leaves (e.g., 9.5 to 12.4 Bar). From a practical of view, these variations are minimal and the manually cut and end-effector-cut leaves are in essence of same quality for use in SWP analysis. FIG. 27 showcases frames from the initial and final SWP measurement states for leaves of both types of methods. Each cleanly cut xylem initially shows a well-defined pith, but as full water expression is attained, the xylems are clouded with moisture in the form of water and/or bubbles. One important detail to note for the slight difference between average pressures and range is the sequence of leaf excision. The manually-cut leaves were excised and measured before all of the end-effector-cut leaves, which may have led to the manually cut leaves having a slightly higher pressure measurement overall.

TABLE XI

Stem Water Potential Measurements

| Cut Method | # of Leaves | Avg. Pressure (Bar) | Std. Dev (Bar) |
|---|---|---|---|
| Manual | 5 | 11.34 | 0.96 |
| End-effector | 5 | 10.84 | 1.14 |

Contributions and Key Findings: This work proposed a novel end-effector design capable of cleanly cutting the stem of a leaf for use in stem water potential analysis. The system can cut leaves from different types of trees (avocado, clementine, grapefruit, and lemon) with a success rate of 93.75%. However, only 61.25% were clean cuts with suitable stem length for pressure chamber analysis. The enclosure of the end-effector allows capturing a bagged leaf without affecting the reliability of the SWP measurement. The average measured pressure for the end-effector and manual cuts align closely (cf. 10.84 to 11.34 Bar, respectively). The camera placement on the end-effector allows for detection of the leaf on the tree, while providing useful information about the position of the stem.

Directions for Future Work: The next step is to develop an autonomous robotic system able to detect, localize, cut, and retain bagged leaves for stem water potential analysis in tree crops. An optimization of the design will enhance the performance of the system and allow the robot to reach leaves within the canopy closer to the trunk. Future work regarding stem water potential measurements will focus on automation of such measurements with a computer vision control system. Such a system will be capable of detecting xylem water expression more accurately than a human operator; additionally, the system will be able to control the airflow status of the pressure chamber system to release highly pressurized air after the detection of the wet point. Such features will increase the efficiency and accuracy of SWP measurements, as well as operator safety since the system requires no operator to be within proximity to the "pressure bomb." Finally, to enable the full automation of the stem water potential analysis, the captured leaf will need to be transferred from the end-effector into a pressure chamber.

Example 4

Field Pneumatic Leaf Cutting Test

Experiments were designed to assess the pneumatic leaf sampling framework performance. In addition to indoor tests performed using a real potted avocado tree, multiple real-world experiments in the Agricultural Experimental Station (AES) at the University of California, Riverside were conducted (FIG. 28).

Overview: An experimental trial starts with the perception system detecting and locating the leaves and returning the center point and dimensions (width, height, and length) of each leaf. From there, the system calculates the position and orientation of the tip and stem of each leaf and sorts their positions from the closest to the furthest leaf. Since the leaves' position and orientation are with respect to the camera, a transformation of all the reference frames to the planning frame of the robot is applied, which allows filtering out leaves that are outside of the robot's workspace.

The workspace filter rejects leaves that are outside of the reachable limit of the robotic arm, as well as leaves with an orientation that is unreachable by the end-effector. For this application, the robotic arm workspace was set to a maximum radius of 0.98 m from the base of the robotic arm, and a minimum height of 0.25 m and a maximum height of 1.26 m. Leaves are also filtered by projecting the orientation of the leaf onto the planning frame, where the system can determine the roll, pitch, and yaw of the leaf and reject the ones that the end-effector cannot reach. Leaves that have a yaw (rotation along the normal of the leaf) that is outside of a predetermined range (e.g., −90° to 90°) are rejected as well as leaves that have a pitch (along the horizontal axis) outside of a predetermined range (e.g., −90° to 15°). At the end of the process, the robot has a queue of reachable leaves with a high success rate of extraction.

The leaves at various phases of the process were categorized. At first, there are leaf candidates which are located within the arm's workspace. Viable leaves are leaf candidates having a feasible path inside the workspace. If a leaf is successfully enclosed in the end-effector, it will be defined as a successful capture. The removal of the leaf will be marked as a successful cut and as a clean cut if the leaf is severed cleanly at the petiole with damaging the main area of the blade (lamina).

Indoor Experiments

Forty-two trials with random position and orientation of the end-effector at a range of distances (e.g., 0.2-0.4 m) were conducted. For each trial, a point cloud is processed and provides potential leaves. The potential leaves are then sent to the actuation module for a capture attempt. Each trial concludes with a cut of the captured leaf. A total of 78 candidate leaves were obtained, 36 of which were viable. Of the 36 leaves, 27 were captured effectively (75%) whereas 25 out of 27 were removed (92.6%). With a 92% success rate, we acquired 23 clean cut stems with a minimum length of 5 mm. Table XII summarizes the retrieval results.

The processing times for leaf detection are 1.43 sec and 16.43 sec, respectively, and are explained by the process of the complete point clouds obtained, the size of which varies with the end-effector position. Furthermore, the motion planning has a minimum of 4.3 sec and a maximum of 25.87 sec, which corresponds to the variation in distance between the end-effector and the detected leaves.

Outdoor Field Experiments

Using the same approach as the indoor environment, 21 trials were performed with random location and orientation of the end-effector at a range of distances (e.g., 0.2-0.5 m). From a total of 90 candidate leaves, 21 proved to be viable. Out of the 21 leaves, 16 were efficiently enclosed (76.2%), while 10 were cut (62.6%). We acquired 6 neatly cut stems with a minimum stem length of 5 mm (Table XII). The air suction system helped secure the capture of the leaf as some instances of wind during experiments were encountered.

TABLE XII

LEAF RETRIEVAL NUMBERS & RATES

| | Setting | | | | | |
|---|---|---|---|---|---|---|
| | Indoor | | Outdoor | | Overall | |
| Stage | Number | Rate | Number | Rate | Number | Rate |
| Potential Leaves | 132 | N/A | 193 | N/A | 325 | N/A |
| Candidate Leaves | 78 | 59.1% | 90 | 46.6% | 168 | 51.7% |
| Viable Leaves | 36 | 46.1% | 21 | 23.33% | 57 | 34% |
| Successful Captures | 27 | 75% | 16 | 69.56% | 43 | 75.4% |
| Successful Cuts | 25 | 92.6% | 10 | 62.5% | 35 | 81.4% |
| Clean Cuts | 23 | 92% | 6 | 60%| | 29 | 82.8% |
| Near Misses | 2 | 8% | 4 | 40% | 6 | 17.2% |

In terms of time performance, the mean time processing for the perception module is 9.72 sec, and for the actuation module, it is 37.34 sec, with an overall time processing of 46.61 sec. (Table XIII).

TABLE XIII

LEAF RETRIEVAL PERFORMANCE TIME (SECONDS)

| | Setting | | | | | | | | |
|---|---|---|---|---|---|---|---|---|---|
| | Indoor | | | Outdoor | | | Overall | | |
| Metric | Perception | Actuation | Full Retrievst | Perception | Actuation | Full Retrieval | Perception | Actuation | Full Retrieval |
| Min | 1.43 | 25.33 | 37.00 | 4.29 | 27.57 | 38.70 | 1.43 | 27.57 | 37.00 |
| Max | 16.43 | 57.46 | 64.56 | 25.87 | 45.80 | 57.48 | 25.88 | 57.46 | 64.56 |
| Mean | 6.27 | 35.68 | 44.72 | 9.72 | 37.34 | 48.52 | 8.18 | 37.93 | 46.38 |
| Median | 6.18 | 34.83 | 44.20 | 9.10 | 36.33 | 48.93 | 6.84 | 37.71 | 46.34 |
| Std dev | 3.11 | 7.31 | 5.55 | 4.52 | 4.72 | 4.10 | 4.23 | 5.65 | 5.27 |

Discussion of Collective Findings

In total, 43 leaves were successfully captured with an overall rate of 81.4% of successful cut with a mean time of 46.38 sec. 29 clean cuts were performed and only 6 near misses were encountered. These findings demonstrate the efficiency of the new end-effector in retrieving leaves but also its ability to avoid damaging the leaves if met with an unsuccessful cut. There were some interferences with other leaves as the end-effector reached the target, but not enough to impact the success rates.

The perception module provided reliable position and orientation of the leaves but also dimensions that were critical to position the end-effector at the right position during the different phases of extraction. Leaves that are curved towards the midrib reduced the surface area of the detected leaf, which affects the location of the end-effector at the tip and may make the air suction less effective.

Some limitations were also observed. High motion velocity can at times lead to misalignment with the enclosure and in turn to a failed capture and cut (Table XIV). Further, it was observed that sometimes the planner fails at providing a feasible path for leaves in the workspace. This can be linked to the original position of the arm prior the process initiates, thus leading to limits to angle joint during operation.

TABLE XIV

ACTUATION PERFORMANCE TIME (SECONDS)

| Metric | Planning | Motion | Overall Actuation |
| --- | --- | --- | --- |
| Min | 18.58 | 5.59 | 27.57 |
| Max | 46.88 | 20.06 | 57.46 |
| Mean | 32.81 | 8.81 | 37.93 |
| Median | 31.88 | 8.23 | 37.71 |
| Std dev | 2.51 | 6.41 | 5.65 |

A computer-implemented method is disclosed. The method comprises: receiving, from a camera, an image comprising a leaf; generating, based on the image, a point cloud; identifying a portion of the point cloud associated with the leaf; determining, based on the portion of the point cloud, a pose of the leaf, wherein: the pose comprises a position and an orientation of the leaf, an end-effector is aligned to the leaf based on the pose of the leaf, and a pneumatic subsystem is enabled; enclosing the leaf in a chamber of the end-effector, wherein, after the aligning the end-effector to the leaf, the chamber of the end-effector is moved toward the leaf to enclose the leaf; cutting, via a blade of the end-effector, a stem of the leaf; and storing the leaf in the chamber of the end-effector. Additionally or alternatively, in some embodiments of the method: the end-effector is coupled to an arm; and the arm aligns the end-effector to the leaf and moves the end-effector toward the leaf. Additionally or alternatively, in some embodiments of the method: the end-effector comprises the camera; and the camera takes images of the leaves as it moves toward the leaf. Additionally or alternatively, in some embodiments of the method: the end-effector actuates a slider for occluding the chamber, wherein: the slider is coupled to the blade and a piston; and the piston actuates the slider and the blade. Additionally or alternatively, in some embodiments of the method: the end-effector actuates a gate for occluding the chamber, wherein: the gate is coupled to the blade and two four-bar linkages; and the two four-bar linkages actuate the gate and the blade. Additionally or alternatively, in some embodiments of the method: the point cloud comprises a second portion, the second portion comprising points at distances greater than a threshold distance from the camera, and the method further comprises: identifying the second portion; and disregarding the second portion for the identifying the portion of the point cloud associated with the leaf. Additionally or alternatively, in some embodiments of the method: the identifying the portion of the point cloud associated with the leaf comprises: downsampling the portion of the point cloud; and clustering the portion of the point cloud. Additionally or alternatively, in some embodiments of the method: the determining the pose of the leaf comprises: bounding a clustered portion of the point cloud; and determining a center, dimensions, and orientation of the bounded cluster. Additionally or alternatively, in some embodiments of the method: the image comprises a second leaf, the method further comprising: identifying a second portion of the point cloud associated with the second leaf; determining, based on the second portion of the point cloud, a second pose of the second leaf, wherein: the second pose comprises a position and an orientation of the second leaf, and the end-effector is aligned to the second leaf based on the second pose of the second leaf; enclosing the second leaf in the chamber of the end-effector, wherein, after the aligning the end-effector to the second leaf, the chamber of the end-effector is moved toward the second leaf to enclose the second leaf; cutting, via the blade of the end-effector, a stem of the second leaf; and storing the second leaf in the chamber of the end-effector. Additionally or alternatively, in some embodiments of the method: the end-effector is aligned to the second leaf, suction is enabled, the end-effector is moved toward the second leaf, the stem of the second leaf is cut, and the second leaf is stored in accordance with a determination that the leaf is damaged. Additionally or alternatively, in some embodiments of the method: the pneumatic subsystem actuates suction within the end-effector using a solenoid, an air compressor, and an air tank. Additionally or alternatively, in some embodiments, the method further comprises: receiving, from the camera, a second image different from the image; generating, based on the second image, a second point cloud; and identifying a portion of the second point cloud, wherein the portion of the point cloud is associated with a second leaf. Additionally or alternatively, in some embodiments of the method: the determining the pose of the leaf further comprises identifying the stem of the leaf, a tip of the leaf, and a centroid of the leaf.

An end-effector is disclosed. The end-effector comprises: a camera configured to take images of the leaves to send to the processor; a blade configured to cut the leaves; a chamber to encapsulate the leaves for cutting and storage; and one or more processors configured to cause the end-effector to perform the aforementioned method. Additionally or alternatively, in some embodiments of the end-effector: the weight of the end-effector is less than 1.3 kg. Additionally or alternatively, in some embodiments of the end-effector: the chamber has a width of 110 mm, a height of 45 mm, and a depth of 185 mm. Additionally or alternatively, in some embodiments of the end-effector: a force for cutting the stem is 2.9-20 N, or operates at a pressure no greater than 120 psi. Additionally or alternatively, in some embodiments of the end-effector: the camera comprises a depth camera configured to provide images of the leaf to transmit to the processor for leaf detection. Additionally or alternatively, in some embodiments of the end-effector: the end-effector further comprises a slider for occluding the chamber, the slider is coupled to the blade and a piston, and the piston is configured to actuate the slider and the blade. Additionally or alternatively, in some embodiments of the end-effector: the end-effector further comprises a gate for occluding the chamber, the gate is coupled to the blade and two four-bar linkages, and the two four-bar linkages are configured to actuate the gate and the blade.

A system is disclosed. The system comprises: an end-effector comprising: a camera configured to take images of the one or more leaves to send to one or more processors; a blade configured to cut the one or more leaves; a chamber to encapsulate the one or more leaves for cutting and storage; and wherein the one or more processors are configured to cause the end-effector to perform the aforementioned method; a pneumatic system configured to use suction to align the one or more leaves; an arm coupled to the end-effector and configured to move the end-effector with six degrees of freedom; and a base coupled to the arm and comprising wheels. Additionally or alternatively, in some embodiments of the system: the pneumatic system comprises an air compressor, an air tank, and a solenoid.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A computer-implemented method for collecting one or more leaves, comprising:
   receiving, from a camera, an image comprising a leaf;
   generating, based on the image, a point cloud;
   identifying a portion of the point cloud associated with the leaf;
   determining, based on the portion of the point cloud, a pose of the leaf, wherein:
      the pose comprises a position and an orientation of the leaf,
      an end-effector is aligned to the leaf based on the pose of the leaf, and
      a pneumatic subsystem is enabled;
   enclosing the leaf in a chamber of the end-effector, wherein, after the aligning the end-effector to the leaf, the chamber of the end-effector is moved toward the leaf to enclose the leaf;
   cutting, via a blade of the end-effector, a stem of the leaf; and
   storing the leaf in the chamber of the end-effector.

2. The method of claim 1, wherein:
   the end-effector is coupled to an arm; and
   the arm aligns the end-effector to the leaf and moves the end-effector toward the leaf.

3. The method of claim 1, wherein:
   the end-effector comprises the camera; and
   the camera takes images of the leaves as it moves toward the leaf.

4. The method of claim 1, wherein:
   the end-effector actuates a slider for occluding the chamber, wherein:
      the slider is coupled to the blade and a piston; and
      the piston actuates the slider and the blade.

5. The method of claim 1 wherein:
   the end-effector actuates a gate for occluding the chamber, wherein:
      the gate is coupled to the blade and two four-bar linkages; and
      the two four-bar linkages actuate the gate and the blade.

6. The method of claim 1, wherein:
   the point cloud comprises a second portion, the second portion comprising points at distances greater than a threshold distance from the camera, and the method further comprises:
      identifying the second portion; and
      disregarding the second portion for the identifying the portion of the point cloud associated with the leaf.

7. The method of claim 1, wherein the identifying the portion of the point cloud associated with the leaf comprises:
   downsampling the portion of the point cloud; and
   clustering the portion of the point cloud.

8. The method of claim 1, wherein the determining the pose of the leaf comprises:
   bounding a clustered portion of the point cloud; and
   determining a center, dimensions, and orientation of the bounded cluster.

9. The method of claim 1, wherein the image comprises a second leaf, the method further comprising:
   identifying a second portion of the point cloud associated with the second leaf;
   determining, based on the second portion of the point cloud, a second pose of the second leaf, wherein:
      the second pose comprises a position and an orientation of the second leaf, and
      the end-effector is aligned to the second leaf based on the second pose of the second leaf;
   enclosing the second leaf in the chamber of the end-effector, wherein, after the aligning the end-effector to the second leaf, the chamber of the end-effector is moved toward the second leaf to enclose the second leaf;
   cutting, via the blade of the end-effector, a stem of the second leaf; and
   storing the second leaf in the chamber of the end-effector.

10. The method of claim 9, wherein the end-effector is aligned to the second leaf, suction is enabled, the end-effector is moved toward the second leaf, the stem of the second leaf is cut, and the second leaf is stored in accordance with a determination that the leaf is damaged.

11. The method of claim 1, wherein the pneumatic subsystem actuates suction within the end-effector using a solenoid, an air compressor, and an air tank.

12. The method of claim 1, further comprising:
   receiving, from the camera, a second image different from the image;
   generating, based on the second image, a second point cloud; and
   identifying a portion of the second point cloud, wherein the portion of the point cloud is associated with a second leaf.

13. The method of claim 1, wherein the determining the pose of the leaf further comprises identifying the stem of the leaf, a tip of the leaf, and a centroid of the leaf.

14. An end-effector for collecting one or more leaves, comprising:
   a camera configured to take images of the leaves to send to the processor;
   a blade configured to cut the leaves;
   a chamber to encapsulate the leaves for cutting and storage; and
   one or more processors configured to cause the end-effector to perform the method of claim 1.

15. The end-effector of claim 14, wherein a weight of the end-effector is less than 1.3 kg.

16. The end-effector of claim 14, wherein the chamber has a width of 110 mm, a height of 45 mm, and a depth of 185 mm.

17. The end-effector of claim 14, wherein a force for cutting the stem is 2.9-20 N, or operates at a pressure no greater than 120 psi.

18. The end-effector of claim 14, wherein the camera comprises a depth camera configured to provide images of the leaf to transmit to the processor for leaf detection.

19. The end-effector of claim 14, wherein:
   the end-effector further comprises a slider for occluding the chamber,
   the slider is coupled to the blade and a piston, and
   the piston is configured to actuate the slider and the blade.

20. The end-effector of claim 14, wherein:
   the end-effector further comprises a gate for occluding the chamber, the gate is coupled to the blade and two four-bar linkages, and the two four-bar linkages are configured to actuate the gate and the blade.

21. A system for collecting one or more leaves, comprising:
   an end-effector comprising:
      a camera configured to take images of the one or more leaves to send to one or more processors;
      a blade configured to cut the one or more leaves;
      a chamber to encapsulate the one or more leaves for cutting and storage; and
      wherein the one or more processors are configured to cause the end-effector to perform the method of claim 1;
   a pneumatic system configured to use suction to align the one or more leaves;
   an arm coupled to the end-effector and configured to move the end-effector with six degrees of freedom; and
   a base coupled to the arm and comprising wheels.

22. The system of claim 21, wherein the pneumatic system comprises an air compressor, an air tank, and a solenoid.

* * * * *